(12) United States Patent
Schad et al.

(10) Patent No.: US 9,636,859 B2
(45) Date of Patent: May 2, 2017

(54) LOCK MEMBER FOR AN INJECTION MOLDING MACHINE

(71) Applicant: Athena Automation Ltd., Vaughan (CA)

(72) Inventors: Robert D. Schad, Toronto (CA); Carsten Link, Burlington (CA)

(73) Assignee: ATHENA AUTOMATION LTD., Vaughan (CA)

( * ) Notice: Subject to any disclaimer, the term of this patent is extended or adjusted under 35 U.S.C. 154(b) by 75 days.

(21) Appl. No.: 14/719,703

(22) Filed: May 22, 2015

(65) Prior Publication Data

US 2015/0290856 A1   Oct. 15, 2015

Related U.S. Application Data

(62) Division of application No. 14/277,114, filed on May 14, 2014, now Pat. No. 9,067,355.

(60) Provisional application No. 61/823,176, filed on May 14, 2013, provisional application No. 61/877,484, filed on Sep. 13, 2013.

(51) Int. Cl.
    B29C 45/17   (2006.01)
    B29C 45/66   (2006.01)
    B29C 45/67   (2006.01)
    B29C 45/68   (2006.01)
    B29L 31/00   (2006.01)

(52) U.S. Cl.
    CPC .......... *B29C 45/66* (2013.01); *B29C 45/1747* (2013.01); *B29C 45/6728* (2013.01); *B29C 2045/688* (2013.01); *B29L 2031/757* (2013.01)

(58) Field of Classification Search
    CPC ............ B29C 45/1747; B29C 45/6707; B29C 45/6728; B29C 2045/688
    See application file for complete search history.

(56) References Cited

U.S. PATENT DOCUMENTS

| 3,729,283 A | 4/1973 | Eggenberger |
| 4,340,346 A | 7/1982 | Hehl |
| 4,874,309 A | 10/1989 | Kushibe et al. |
| 5,066,217 A | 11/1991 | Fukuzawa et al. |

(Continued)

FOREIGN PATENT DOCUMENTS

| AT | 412625 | 5/2002 |
| AT | 13625 U | 5/2014 |

(Continued)

*Primary Examiner* — James Mackey
(74) *Attorney, Agent, or Firm* — Bereskin & Par LLP/S.E.N.C.R.L., S.R.L.

(57) ABSTRACT

A lock assembly for releasably coupling a platen to a tie bar of an injection molding machine includes first and second lock nut segments translatable in a transverse between locked and unlocked positions for respectively engaging and disengaging the tie bar, and a carrier assembly for coupling the lock nut segments to the platen. The carrier assembly provides a slide surface for slidably supporting the lock nut segments during the translation of the lock nut segments between the locked and unlocked positions, and the carrier assembly resiliently supports the slide surface for axial movement of the slide surface with the lock nut segments between an unloaded position in which the lock nut segments are spaced away from the platen by a clearance gap, and a loaded position in which the lock nut segments bear against the platen.

14 Claims, 14 Drawing Sheets

(56) References Cited

U.S. PATENT DOCUMENTS

| | | | |
|---|---|---|---|
| 5,091,124 A | 2/1992 | Zakich | |
| 5,275,550 A * | 1/1994 | Romi | B29C 45/6707 |
| | | | 425/450.1 |
| 6,231,329 B1 * | 5/2001 | Van Keuren, III | B29C 45/6707 |
| | | | 425/169 |
| 6,524,091 B2 | 2/2003 | Romi | |
| 6,733,275 B2 | 5/2004 | Fujita | |
| 6,893,250 B2 | 5/2005 | Meschia et al. | |
| 7,479,005 B2 | 1/2009 | Nogueira et al. | |
| 7,993,129 B2 | 8/2011 | Chiang | |
| 2005/0281908 A1 * | 12/2005 | Tsuji | B29C 45/6728 |
| | | | 425/595 |

FOREIGN PATENT DOCUMENTS

| | | |
|---|---|---|
| DE | 10246730 | 5/2003 |
| DE | 10308303 | 10/2003 |
| DE | 102007012057 | 9/2007 |
| DE | 102012000741 | 7/2012 |
| DE | 102011014783 | 9/2012 |
| EP | 0296410 | 12/1988 |
| GB | 929509 | 6/1963 |
| JP | 06-154989 | 6/1994 |
| JP | 8-309811 | * 11/1996 |
| JP | 2002225100 | 8/2002 |

* cited by examiner

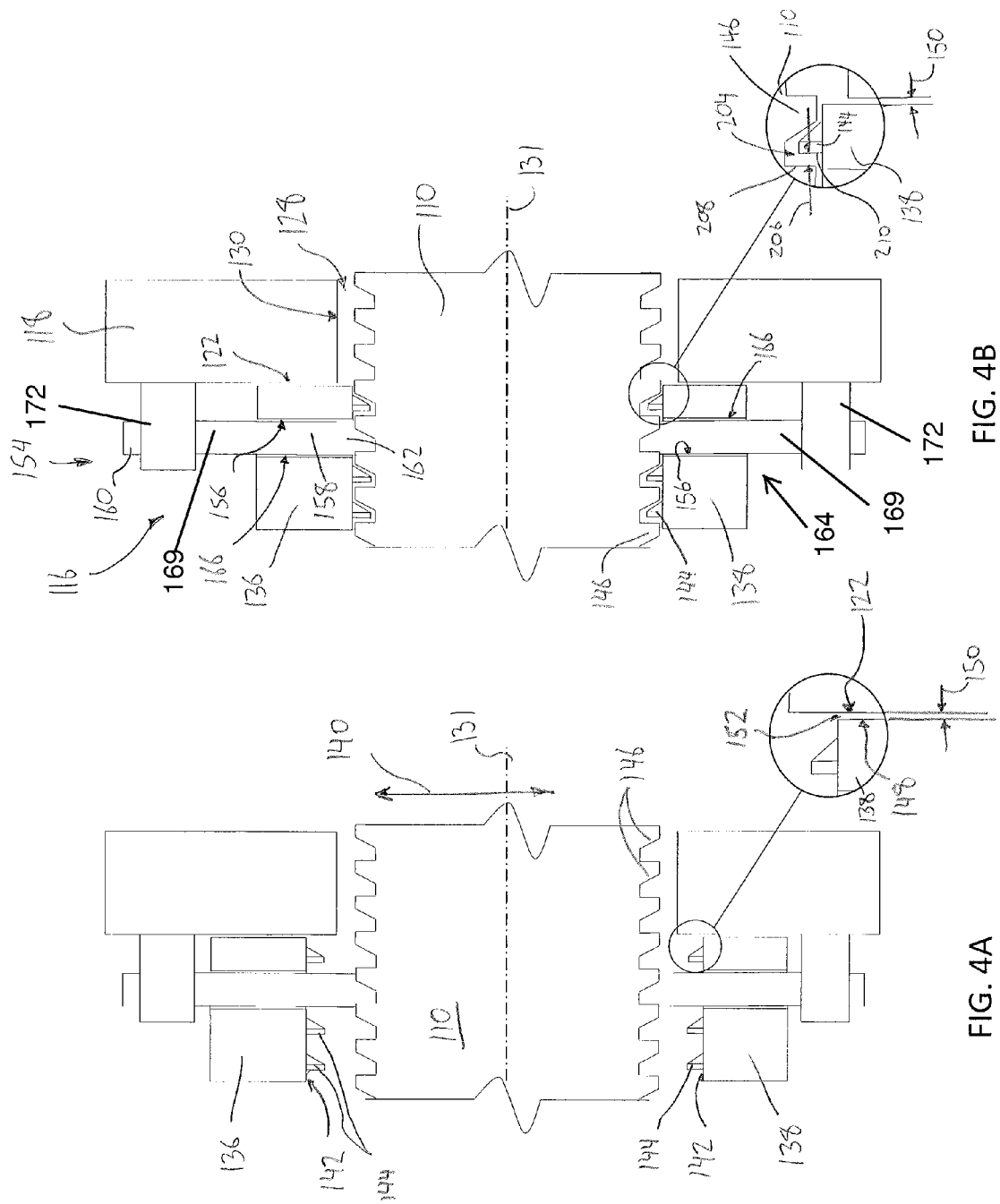

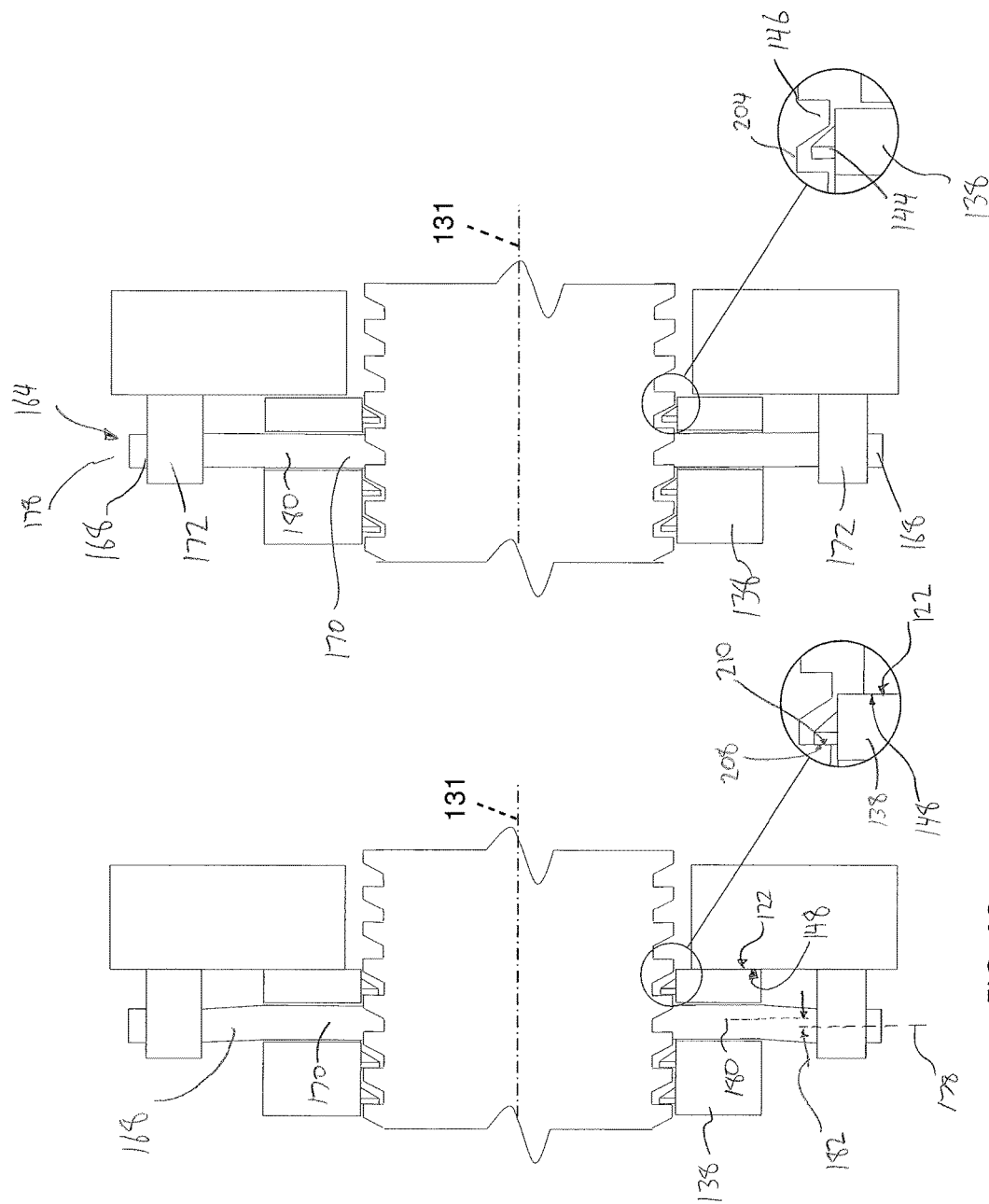

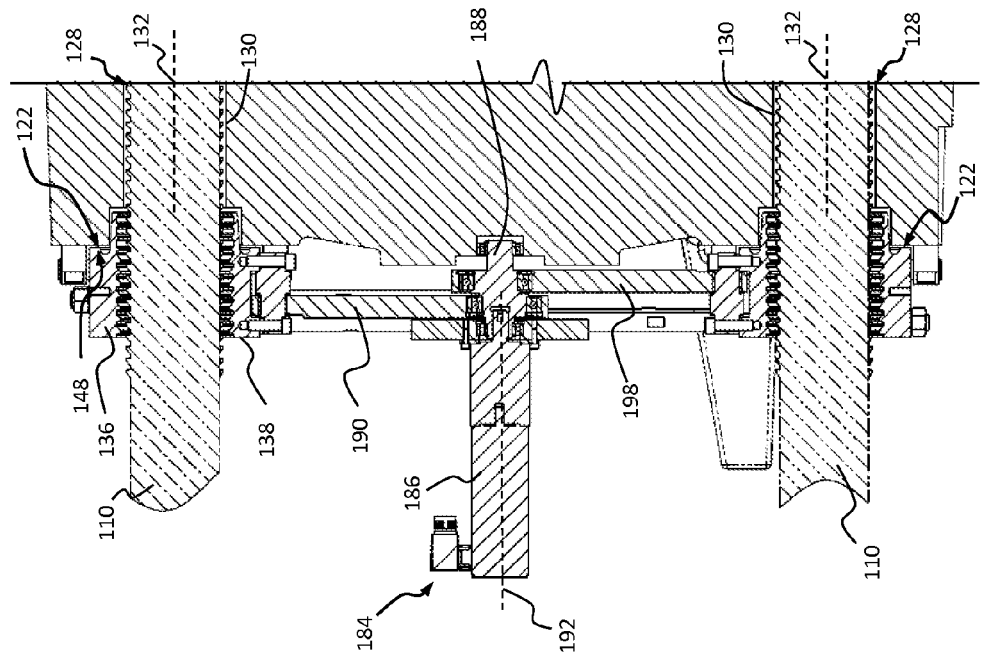
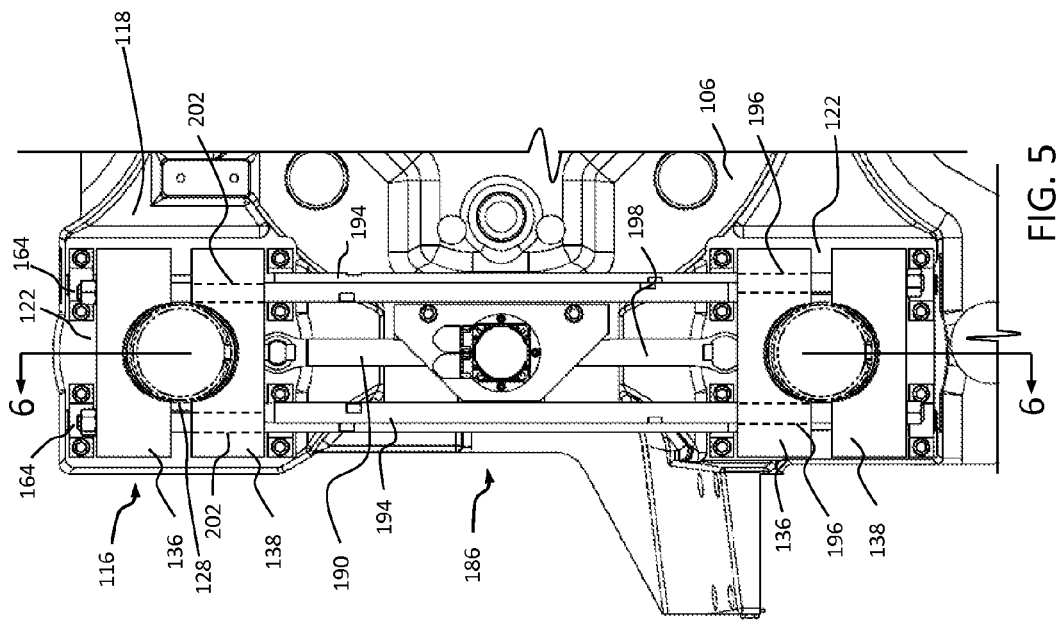
FIG. 6
FIG. 5

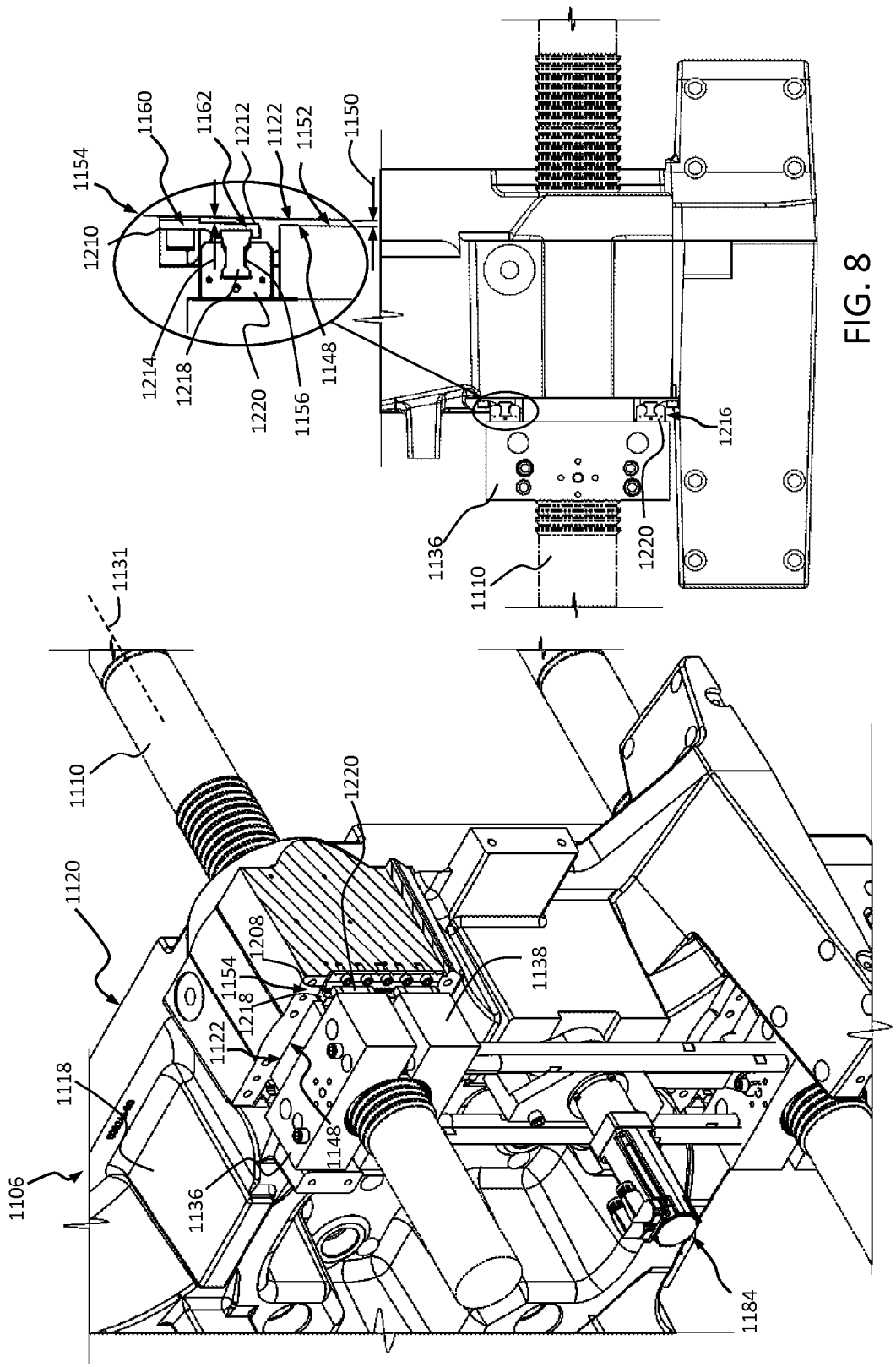

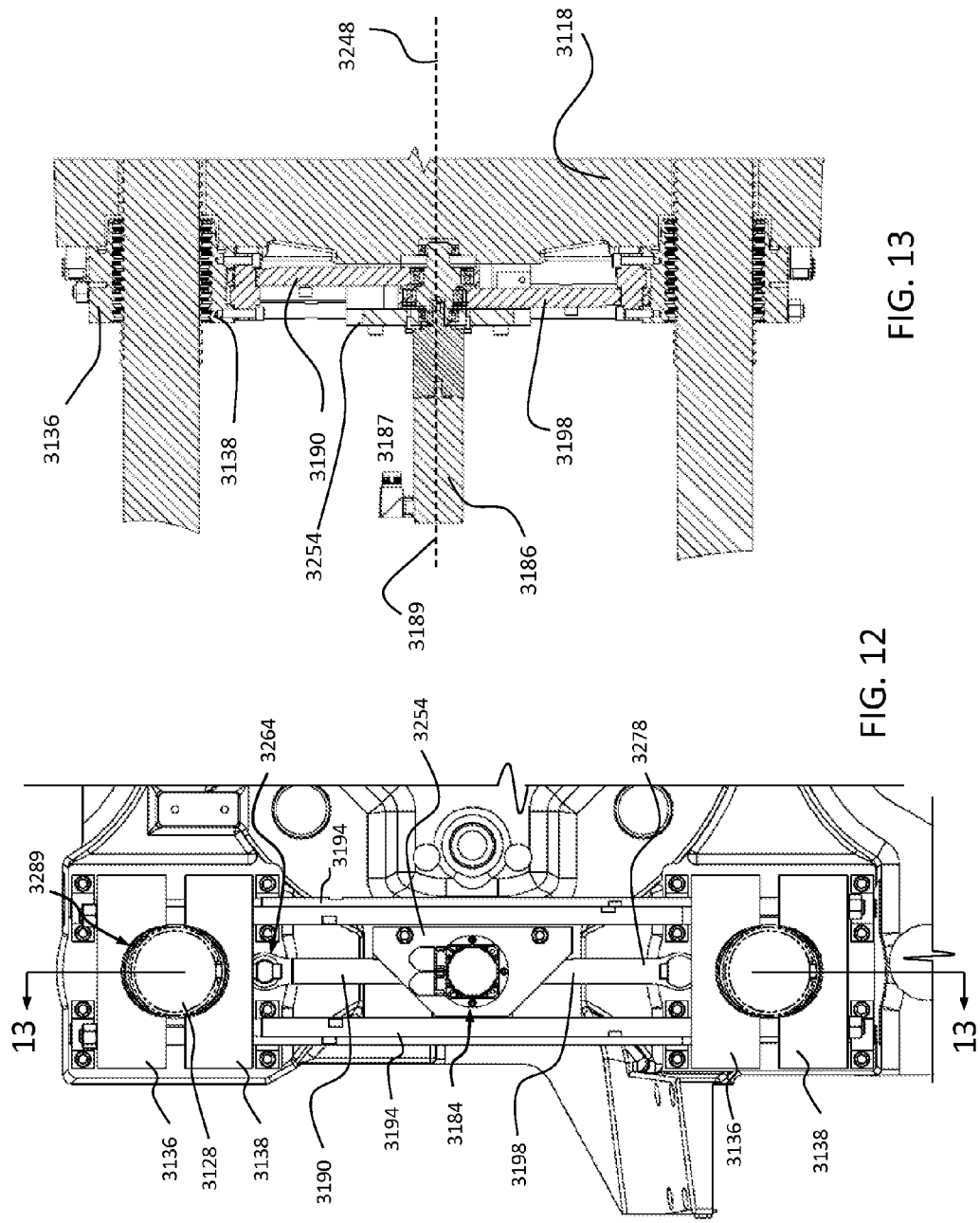

LOCK MEMBER FOR AN INJECTION MOLDING MACHINE

This application is a divisional of U.S. patent application Ser. No. 14/277,114, filed May 14, 2014, which claims the benefit of Provisional Application Ser. No. 61/823,176, filed May 14, 2013, and Provisional Application Ser. No. 61/877,484, filed Sep. 13, 2013, which are hereby incorporated herein by reference.

FIELD

The disclosure relates to injection molding machines, and to methods and apparatuses for releasably locking a platen to a tie bar of an injection molding machine for clamp-up.

BACKGROUND

U.S. Pat. No. 5,091,124 (Zakich) discloses a high tonnage reaction injection molding (RIM) press has fixed and movable platens for clamping a composite mold therebetween at a closed mold position. A plurality of high pressure hydraulic cylinders are mounted on a carrier for the movable platen, and a locking mechanism having a plurality of incrementally spaced locking positions is effective to lock the carrier selectively at said positions. A pair of low power hydraulic piston-cylinder assemblies connected with the carrier adjacent to its opposite ends move the carrier and movable platen to the closed position. Short stroke connecting rods operated by the high pressure cylinders are forced independently of each other into high tonnage engagement with the movable platen at a plurality of locations within the area of the composite mold to clamp the latter between the platens and positively seal its junctions, whereupon a RIM mix head injects the high pressure reactive chemicals into the sealed mold.

U.S. Pat. No. 6,733,275 (Mitsubishi) discloses an electric split nut opening/closing device in which an electric motor is driven, and a half piece is moved linearly while the motion is restrained unequivocally, by which two left and right tie bars can be opened and closed at the same time by one device. In the electric split nut opening/closing device in which a tip-end threaded portion 65a of a tie bar 65, one end of which is fixed to either one of a fixed platen 61 and a movable platen 62 and the other end of which is projected by penetrating the other platen, is engaged with split nut 71, 72 provided on the other platen to connect the fixed platen 61 to the movable platen 62, by which a mold clamping force is generated between the platens by giving tension to the tie bar 65, a pair of left half piece 71a, 72a and right half piece 71b, 72b of the split nut 71, 72 are slidably supported so as to hold the tie bar 65 therebetween, and the left half piece 71a, 72a and right half piece 71b, 72b of the two sets of split nuts 71 and 72 are brought into contact with and separated from each other at the same time by common driving means 86 so as to hold the tie bar 65.

U.S. Pat. No. 7,993,129 (Chen Hsong) discloses an injection molding machine includes a lock nut open-close mechanism provided on a moveable platen (1) to engage with at least two tie bars (3), and comprises a pair of rods (23, 24) connecting two pairs of lock nuts (21, 22), and a clamping unit (2). The clamping unit comprises an execution element (25) and a pair of connecting bars for open-close action (26, 27) symmetrically arranged. A first end of a first connecting bar (26) is connected to the second nut (212) of the first pair of lock nuts (21), and a first end of the second connecting bar (27) is connected to the first nut (221) of the second pair of lock nuts (22). The second ends of the first and second connecting bars are connected to each other and are driven by the execution element (25) simultaneously to open or close the pairs of lock nuts simultaneously.

SUMMARY

The following summary is intended to introduce the reader to various aspects of the applicant's teaching, but not to define any invention. In general, disclosed herein are one or more methods or apparatuses related to injection molding.

According to some aspects, a lock assembly for releasably coupling together a platen and a tie bar of an injection molding machine includes: (a) a first lock nut segment and an opposed second lock nut segment each slidably supported adjacent a bore extending through a platen, the lock nut segments translatable in a transverse direction towards and away from each other between a locked position for engaging a tie bar passing through the bore and an unlocked position for disengaging the tie bar, when in the locked position, a tensile force on the tie rod in an axial direction generally perpendicular to the transverse direction is transferable to the platen via the lock nut segments, and when in the unlocked position, axial movement of the tie bars relative to the lock nut segments is unrestricted by the lock nut segments; (b) an actuation mechanism for moving the first and second lock nut segments between the locked and unlocked positions; and (c) a carrier assembly coupling together the platen and the lock nut segments, the carrier assembly including a slide surface extending in the transverse direction for slidably supporting the lock nut segments during translation of the lock nut segments between the locked and unlocked positions, the slide surface resiliently moveable in the axial direction between a loaded position in which the lock nut segments bear against the platen when the tensile force is applied to the tie bar, and an unloaded position in which the lock nut segments are spaced away from the platen by a clearance gap when the tensile force on the tie rod is released.

According to some aspects, a lock nut actuator mechanism for an injection molding machine includes: (a) a camshaft rotatable about a shaft axis between first and second rotary positions, the camshaft comprising a first eccentric journal and a second eccentric journal axially spaced apart from the first eccentric journal; (b) a rotary drive coupled to the camshaft; (c) a first drive rod having a first proximal end coupled to the first eccentric journal and a first distal end spaced apart from the first proximal end, the first distal end connectable to a first lock nut segment adjacent a first tie rod; and (d) a second drive rod axially spaced apart from the first drive rod and having a second proximal end coupled to the second eccentric journal and a second distal end spaced apart from the second proximal end, the second distal end connectable to a second lock nut segment adjacent a second tie rod. The first and second proximal ends may translate away from the shaft axis when the camshaft is rotated from the second rotary position to the first rotary position for moving the first and second lock nut segments towards and into engagement with the first and second tie bars, respectively, and the first and second proximal ends may translate toward the shaft axis when the camshaft is rotated from the first rotary position to the second rotary position for moving the first and second lock nut segments away from and clear of the first and second tie bars, respectively.

According to some aspects of the teaching disclosed herein, a platen for an injection molding machine includes:

(a) a platen body for supporting a mold section; (b) a first bore in the platen body for receiving a first tie bar, the first bore having a bore periphery and the first bore extending along a first bore axis; (c) first and second lock nut segments for releasably coupling the first tie bar to the platen body, the first and second nut segments moveable relative to the platen body in a transverse direction generally perpendicular to the first bore axis between a locked position in which the nut segments protrude radially inward of the first bore periphery for engagement with the first tie bar, and an unlocked position in which the lock nut segments are spaced radially outward of the bore periphery for free movement of the first tie bar through the first bore; and (d) a carrier assembly for coupling the lock nut segments to the platen. The carrier assembly can provide a slide surface for slidably supporting the lock nut segments during the translation of the lock nut segments between the locked and unlocked positions. The carrier assembly can resiliently support the slide surface for axial movement with the nut segments between an unloaded position in which the nut segments are spaced away from the platen by a clearance gap, and a loaded position in which the nut segments bear against the platen.

According to some aspects, an injection molding machine includes: (a) a first platen and a second platen; (b) at least one tie bar for exerting a clamp load across the platens when stretched; and (c) a lock assembly associated with each of the at least one tie bars. The lock assembly can include (i) first and second lock nut segments translatable in a transverse direction between locked and unlocked positions for respectively engaging and disengaging the tie bar; and (ii) a carrier assembly for coupling the lock nut segments to the platen. The carrier assembly can provide a slide surface for slidably supporting the lock nut segments during the translation of the lock nut segments between the locked and unlocked positions, and the carrier assembly can resiliently support the slide surface for axial movement of the nut segments between an unloaded position in which the nut segments are spaced away from the platen by a clearance gap, and a loaded position in which the nut segments bear against the platen.

According to some aspects, an injection molding machine includes: (a) a first platen and a second platen; (b) at least one tie bar for exerting a clamp load across the platens when stretched; and (c) a lock assembly associated with each of the at least one tie bars. The lock assembly can include (i) first and second lock nut segments translatable in a transverse direction between locked and unlocked positions for respectively engaging and disengaging the tie bar; and (ii) a carrier assembly for coupling the lock nut segments to the platen. The carrier assembly can provide a slide surface for slidably supporting the lock nut segments during the translation of the lock nut segments between the locked and unlocked positions, and the carrier assembly can resiliently support the slide surface for axial movement with the nut segments between an unloaded position in which the nut segments are spaced away from the platen by a clearance gap, and a loaded position in which the nut segments bear against the platen.

According to some aspects, a method of locking and unlocking a platen relative to a tie bar of an injection molding machine includes (a) holding lock nuts in an unlocked position in which lock nut teeth on inner surfaces of the lock nuts are clear of tie bar teeth on the outer surfaces of a tie bar, and resiliently urging the lock nuts away from a back surface of a first platen to which the lock nuts are coupled to provide an axial clearance gap between the lock nuts and the back surface of the first platen; (b) axially moving the first platen to a meshing position relative to the tie bar, the meshing position corresponding to a position in which front surfaces of the tie bar teeth are spaced axially apart from rear surfaces of the lock nut teeth by an axial tooth spacing; (c) moving the lock nuts from the unlocked position to a locked position in which the lock nut teeth protrude radially inward of the tie bar teeth; (d) applying a force on the tie bar in a direction towards a second platen opposite the first platen, wherein (i) the tie bar shifts a first axial amount relative to the lock nut segments and first platen to close the tooth gap; (ii) the tie bar shifts an additional second axial amount relative to the first platen and together with the lock nut segments to close the axial clearance gap; and (iii) the tie bar stretches axially to apply a clamp force across the first and second platens.

According to some aspects, a locking mechanism for coupling a platen to first and second tie bars of an injection molding machine, may include a first lock assembly having first and second lock nut segments translatable between locked and unlocked positions for respectively engaging and disengaging a first tie bar, and a second lock assembly having third and fourth lock nut segments translatable between locked and unlocked positions for respectively engaging and disengaging a second tie bar. The lock assembly may also include a first carrier assembly for slidably coupling the first and second lock nut segments to the platen, and a second carrier assembly for slidably coupling the third and fourth lock nut segments to the platen. A first connecting rod may connect the first lock nut segment and the third lock nut segment so that the first and third lock nut segments translate in unison, and a second connecting rod may connect the second lock nut segment and the fourth lock nut segment so that the second and fourth lock nut segments translate in unison. A lock nut actuator mechanism may include a camshaft that is rotatable about a shaft axis and a drive apparatus drivingly coupled to the camshaft. The camshaft may include a first eccentric journal and a second eccentric journal axially spaced apart from the first eccentric journal. The lock assembly may include a first drive rod having a proximal end coupled to the first eccentric journal and a distal end spaced apart from the proximal end and coupled to the second lock nut segment so that rotation of the camshaft between a first position and a second position causes linear translation of the distal end of the first drive rod and simultaneous translation of the second and fourth lock nut segments between the locked and unlocked positions. The lock assembly may include a second drive rod having a proximal end coupled to the second eccentric journal and a distal end spaced apart from the proximal end and coupled to the third lock nut segment so that rotation of the camshaft between the first position and second position causes linear translation of the distal end of the second drive rod and simultaneous translation of the second and fourth lock nut segments between the locked and unlocked positions.

In some examples, the proximal end of the first drive rod may include a first journal following member rotatably coupled to the first eccentric journal, and the proximal end of the second drive rod may include a second journal following member rotatably coupled to the second eccentric journal. The first journal following member may include a first loop member encircling the first eccentric journal and second journal following members may include a second loop member encircling the second eccentric journal. A bore may extend through the second lock nut segment and the first connecting rod may slidably pass through the bore.

In some examples, rotation of the camshaft from the first position to the second position in a first rotation direction causes the distal end of the first drive rod to translate in a first translation direction, and the first and second eccentric journal portions may be configured so that continued rotation of the cam shaft in the first rotation direction from the second position to the first position causes the distal end of the first drive rod to translate in a second translation direction opposite the first translation direction. In some examples, rotating the camshaft from the first position to the second position may include rotating the camshaft 180 degrees in the first rotation direction and/or rotating the camshaft from the second position and to the first position may include rotating the camshaft 180 degrees in the first rotational direction. In some examples, the camshaft has an inner end rotatably coupled to the platen and an outer end axially spaced apart from the inner end and rotatably coupled to the platen, and the first and second eccentric journal portions may be disposed axially between the inner and outer ends. In some examples, the drive apparatus is coupled to the outer end of the camshaft.

In some examples, the drive apparatus includes an electric motor driving an output shaft that is rotatable about a motor axis, and the motor axis can be coaxial with the camshaft axis. A gear box may be disposed between the motor and the output shaft.

In some examples, the carrier assembly may provide a slide surface for slidably supporting the lock nut segments during the translation of the lock nut segments between the locked and unlocked positions, and the carrier assembly may resiliently support the slide surface for axial movement of the nut segments between an unloaded position in which the nut segments are spaced away from the platen by a clearance gap, and a loaded position in which the nut segments bear against the platen. The first carrier assembly may include a flexible member having a static portion for mounting in fixed relation to the platen and a dynamic portion joined to the static portion and resiliently flexible relative to the static portion. In some examples, the dynamic portion of the flexible member is resiliently flexible in an axial direction. In some examples, the slide surface comprises at least a portion of the dynamic portion of the flexible member.

In some examples, the flexible member may include a pair of guide rods, and the first and second lock nut segments may have bores through which the guide rods pass. The first and second lock nut segments may be slidable along the guide rods.

According to some aspects of the teaching disclosed herein, a platen for an injection molding machine may include a platen body for supporting a mold section and first bore in the platen body for receiving a first tie bar. The first bore may have a first bore periphery and may extend along a first bore axis. The platen may include a second bore in the platen body for receiving a second tie bar. The second bore may have a second bore periphery and the second bore may extend along a second bore axis. The platen may include a first lock assembly having first and second lock nut segments for releasably coupling the first tie bar to the platen body. The first and second nut segments may be moveable relative to the platen body in a transverse direction generally perpendicular to the first bore axis between a locked position in which the first and second nut segments protrude radially inward of the first bore periphery for engagement with the first tie bar, and an unlocked position in which the first and second lock nut segments are spaced radially outward of the first bore periphery for free movement of the first tie bar through the first bore. The platen may include a second lock assembly comprising third and fourth lock nut segments for releasably coupling the second tie bar to the platen body. The third and fourth nut segments may be moveable relative to the platen body in the transverse direction between a locked position in which the third and fourth nut segments protrude radially inward of the second bore periphery for engagement with the second tie bar, and an unlocked position in which the third and fourth lock nut segments are spaced radially outward of the second bore periphery for free movement of the first tie bar through the first bore. The platen may also include a first a carrier assembly for slidably coupling the first and second lock nut segments to the platen, and a second carrier assembly for slidably coupling the third and fourth lock nut segments to the platen. A first connecting rod may connect the first lock nut segment and the third lock nut segment so that the first and third lock nut segments translate in unison, and a second connecting rod may connect the second lock nut segment and the fourth lock nut segment so that the second and fourth lock nut segments translate in unison. A lock nut actuator mechanism may be mounted to an actuator support portion of the platen and may have a camshaft that is rotatable about a shaft axis and a drive apparatus drivingly coupled to the camshaft. The camshaft may include a first eccentric journal portion and a second eccentric journal portion axially spaced apart from the first eccentric journal portion. A first drive rod may have a proximal end coupled to the first eccentric journal and a distal end spaced apart from the proximal end and coupled to the second lock nut segment so that rotation of the camshaft between a first position and a second position causes linear translation of the first drive rod and simultaneous translation of the second and fourth lock nut segments between the locked and unlocked positions. A second drive rod may be axially spaced apart from the first drive rod and may have a proximal end coupled to the second eccentric journal and a distal end spaced apart from the proximal end and coupled to the third lock nut segment so that rotation of the camshaft between the first position and second position causes linear translation of the second drive rod and simultaneous translation of the second and fourth lock nut segments between the locked and unlocked positions.

According to some aspects of the teaching disclosed herein, a lock assembly for coupling a platen to a tie bar of an injection molding machine may include first and second lock nut segments translatable in a direction generally orthogonal to the axial direction between locked and unlocked positions for respectively engaging and disengaging the tie bar. The first lock nut segment may include an arcuate inner surface having radially inwardly projecting engagement elements that engage the tie bar when in the locked position. The radially inwardly projecting engagement elements may be provided along a first axial extent of the first lock nut segment and defining a tie bar engagement portion extending axially between a proximal end positionable toward the platen and a distal end axially spaced apart from the proximal end. The first lock nut segment may have an outer surface comprising at least a first abutment surface disposed to abut a first bearing surface on the platen when the first lock nut segment is in the locked position to transfer an axial clamp load from the first lock nut segment to the platen. The first abutment surface may have a first radially outer extent. The first lock nut segment may also include a narrowing section having a second axial extent bounded by a first position proximate the first abutment surface and a second position spaced axially from the first abutment surface in a direction towards the proximal end of the tie bar engagement portion. The second axial extent may be at least 25% of the first axial extent. The first lock nut segment may have a major load portion having a third axial extent bounded by the first abutment surface and a first one of the plurality of radially inwardly projecting engagement elements, the first one of the radially inwardly projecting engagement elements being axially nearest the proximal end of the tie bar engagement portion. The lock assembly may also include a first a carrier assembly for slidably coupling the first and second lock nut segments to the platen and a lock nut actuator mechanism coupled to the first and second lock nut segments and operable to translate the first and second lock nut segments between the locked and unlocked positions.

In some examples, the second axial extent is equal to or greater than the third axial extent and/or the third axial extend is at least 25% of the first axial extent. In some examples, the first abutment surface may be axially intermediate the first position and the second position.

In some examples, the outer surface of the first lock nut segment along the narrowing section may be defined by a taper that starts at the first position and ends at the second position. In some examples, the major load portion may be nested within a pocket in the platen when the first lock nut segment is in the locked position.

In some examples, the major load zone includes at least 3 radially inwardly projecting engagement elements and the narrowing region includes at least 4 radially inwardly projecting engagement elements.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the teaching of the present specification and are not intended to limit the scope of what is taught in any way.

In the drawings:

FIGS. 4A-4D are schematic representations of side views of the a portion of the platen structure of FIG. 3, showing a lock nut in various positions during operation of the machine;

FIG. 5 is an enlarged view of a portion of the platen structure of FIG. 2, showing actuator elements in greater detail;

FIG. 6 is sectional perspective view of the platen structure of FIG. 5, taken along the lines 6-6;

FIG. 7 is a partially cut-away perspective view of a portion of an alternate platen structure;

FIG. 8 is a top view of the structure of FIG. 7;

FIG. 12 is an enlarged view of a portion of FIG. 11;

FIG. 13 is a section view taken along line 13-13 in FIG. 12;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
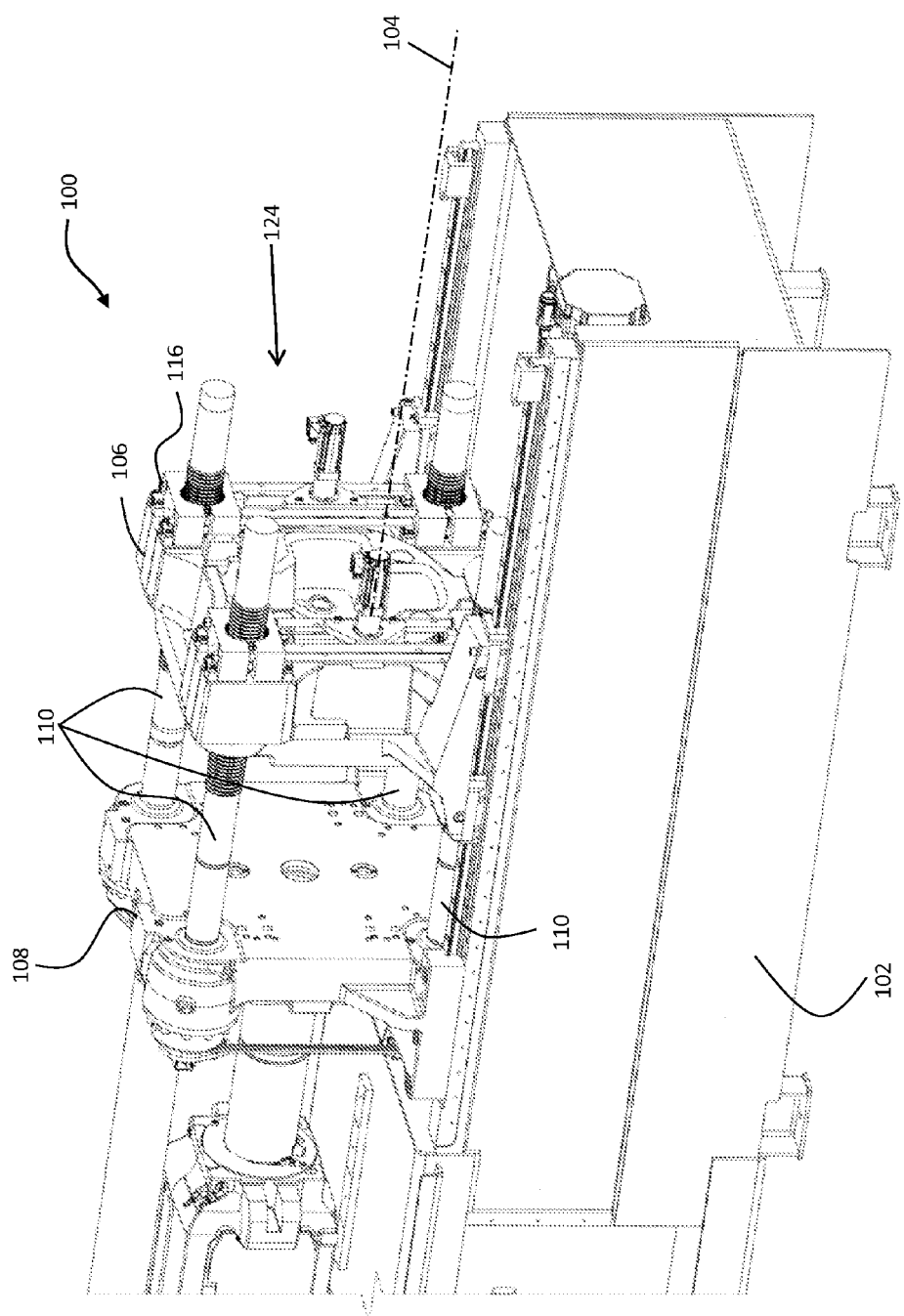
FIG. 1 is a perspective view of a portion of an injection molding machine.

Referring to FIG. 1, an exemplary injection molding machine 100 includes a machine base 102 that extends lengthwise along a machine axis 104. A pair of platens, including a first platen 106 and a second platen 108, are supported by the machine base 102 for carrying respective mold halves of a mold (not shown). At least one tie bar 110 extends generally between the first and second platens 106, 108 for coupling the platens 106 and 108 together and exerting a clamp load across the platens 106 and 108 when stretched. In the example illustrated, the machine 100 includes four tie bars 110, each having a tie bar axis 131 oriented parallel to the machine axis 104.

In the example illustrated, the first platen 106 is also referred to as a moving platen, and the second platen 108 is also referred to as a stationary platen. The first (moving) platen 106 can translate towards and away from the second (stationary) platen 108 along the machine axis 104 to close and open the mold. A platen actuator 112 can be coupled to the moving platen 106 for advancing and retracting the moving platen 106 between mold-closed and mold-open positions.

Figure 2:
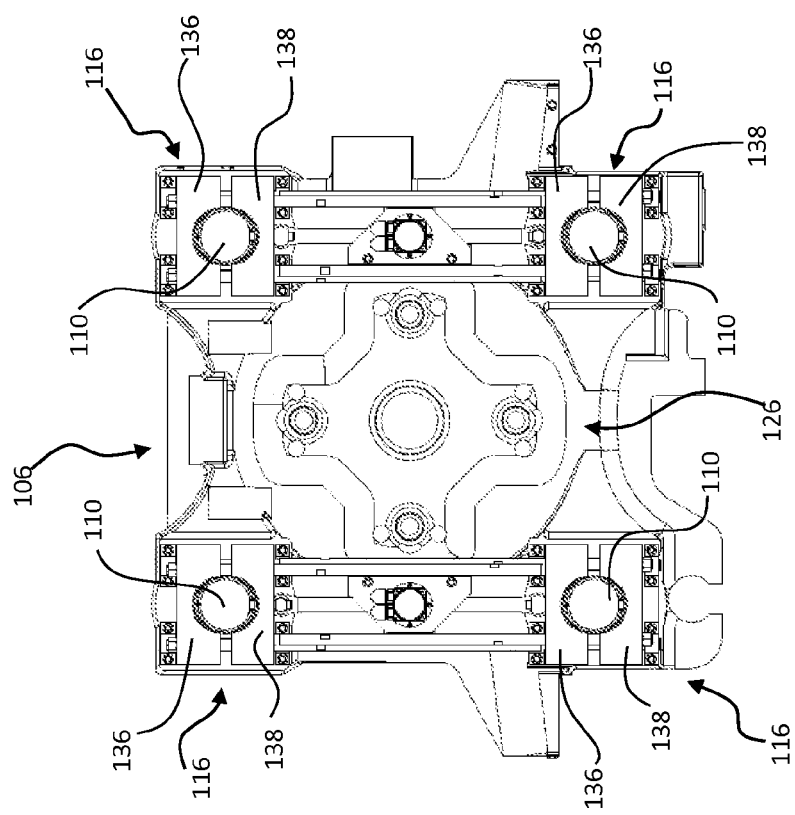
FIG. 2 is a rear elevation view of a platen structure of the machine of FIG. 1.

The machine 100 further includes a lock assembly 116 for releasably coupling the first platen 106 to a respective one of the tie bars 110. Referring to FIG. 2, in the example illustrated, the machine 100 includes four lock assemblies 116, each mounted to the first platen 106 adjacent respective ones of the tie bars 110.

Figure 3:
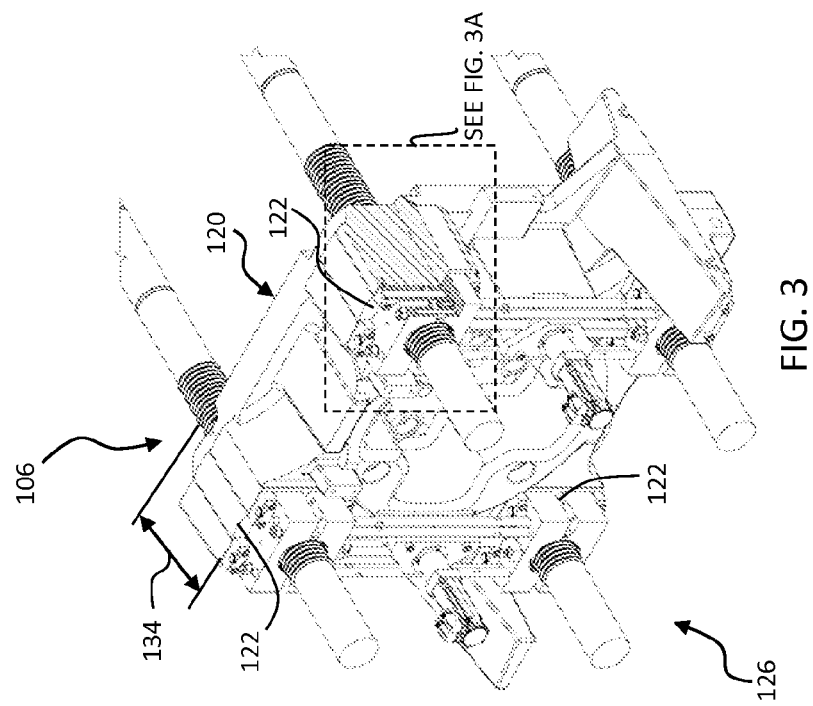
FIG. 3 is a partially cut-away perspective view of the platen structure of FIG. 2.

Referring to FIG. 3, in the example illustrated, the first platen 106 has a platen body 118 with a mold mounting surface 120 for supporting a mold section on a front side 124 of the platen 106 facing the second platen 108, and a plurality of load bearing surfaces 122 on the back side 126 of the first platen 106, opposite the front side 124. Each lock assembly 116 is mounted to the back side 126 of the first platen 106, proximate the load bearing surfaces 122.

Referring to FIG. 6, tie bar bores 128 pass through the platen body 118, in respective corners, for receiving a respective tie bar 110. The bores 128 each extend axially along a respective bore axis 132 and are transversely bounded by a bore periphery 130. The bearing surfaces 122 and mold support surface 120 are spaced apart from each other by a fixed axial distance defining an axial platen thickness 134 of the first platen 106.

Referring to FIG. 5, each lock assembly includes, in the example illustrated, first and second lock nut segments 136 and 138 translatable in a transverse direction between locked (see for example FIG. 4B) and unlocked (see for example FIG. 5 and FIG. 4A) positions for respectively engaging and disengaging the tie bar 110. The transverse direction is generally perpendicular to the tie bar axis 131, and, in the example illustrated, is generally vertical. The first and second lock segments 136 and 138 translate in a vertical direction, as indicated by arrow 140 in FIG. 4A, between locked and unlocked positions.

Referring to FIG. 4A, in the example illustrated, each lock nut segment 136 and 138 has a tie rod engaging surface 142 directed towards the tie bar 110. The tie rod engaging surface 142 includes nut teeth 144 protruding inwardly from an inner concave surface of the nut segments 136 and 138. When the nut segments are moved to the locked position (see for example FIG. 4B), the nut teeth 144 interengage with tie bar teeth 146 protruding outwardly from the tie bar 110 so that the tie bar 110 and platen 106 are coupled together. When in the locked position, a tensile force on the tie rod in the axial direction (along tie bar axis 131, and generally perpendicular to the transverse direction) is transferable to the platen via the lock nut segments 136, 138, and when in the unlocked position, axial movement of the tie bars 110 relative to the lock nut segments is unrestricted by the lock nut segments 136, 138.

The lock nut segments 136 and 138 are also translatable in the axial direction (i.e. parallel to the tie bar axes 131 and machine axis 104) between an unloaded position (see FIGS. 4A, 4B and 4D) in which the nut segments 136 and 138 are spaced apart from the platen 106 and a loaded position (see FIG. 4C) in which the lock nut segments 136 and 138 bear against the platen 106.

In the example illustrated, the lock nut segments have abutment surfaces 148 directed towards the bearing surfaces 122 of the platen 106. The bearing surfaces 122 and abutment surfaces 148 are spaced axially apart from each other by an axial distance 150 to provide a clearance gap 152 when the nut segments 136 and 138 are in the unloaded position (see FIG. 4A). The axial extent of the gap 152 (i.e. the distance 150) may be sized to, in view of dimensional and positional tolerances, ensure that all lock nut segments are spaced apart from the platen during movement between the locked and unlocked position. For example, the axial distance 150 may be between about 0.05 mm and about 2.5 mm or more. In the illustrated embodiment, the axial distance is in the range of about 0.1 mm to about 0.5 mm. Keeping the distance 150 and resulting gap 152 relatively small can help to reduce the energy required to move the lock nut segments 136, 138 from the unloaded position to the loaded position. Providing a relatively small gap 152 may also reduce the amount of time required to move the lock nut segments from the unloaded position to the loaded position.

Referring to FIG. 4C, the abutment surfaces 148 press against the bearing surfaces 122 when the nut segments 136 and 138 are in the loaded position. In the loaded position, there is no clearance gap 152 between the abutment surfaces 148 and the bearing surfaces 122. Spacing the abutment surfaces 148 away from the bearing surfaces 122 when the lock nut segments 136 and 138 are in the unloaded position may allow the lock nut segments 136 and 138 to translate between the locked and unlocked positions without touching the platen 106. This may reduce or eliminate friction between the lock nut segments 136 and 138 and the platen 106 as they translate in the transverse direction, and reduce or eliminate the need for lubrication between these surfaces.

Referring to FIG. 4B, each lock assembly 116 further includes a carrier assembly 154 for coupling the lock nut segments 136 and 138 to the platen 106. The carrier assembly 154 can provide a slide surface 156 extending in the transverse direction for slidably supporting the lock nut segments 136 and 138 during translation of the lock nut segments 136 and 138 between the locked and unlocked positions.

Optimally, the slide surface 156 can be resiliently moveable in the axial direction between a loaded position (generally corresponding to the loaded position of the lock nut segments) in which the lock nut segments 136 and 138 bear against the platen 106 (FIG. 4C) when the tensile force is applied to the tie rod, and an unloaded position (generally corresponding to the unloaded position of the lock nut segments) in which the lock nut segments 136 and 138 are spaced away from the platen 106 by the clearance gap 152 (FIG. 4A) when the tensile force is released. In the example illustrated, the slide surface 156 is axially moveable together with the lock nut segments 136, 138 between unloaded and loaded positions. Relative translation between the lock nut segments and the slide surface in the axial direction is in the example illustrated, inhibited.

Optionally, the carrier assembly 154 comprises a flexible member 158 having a static portion 160 mounted in fixed relation to the platen 106 and a dynamic portion 162 joined to the static portion 160 and resiliently flexible relative to the static portion 160. The dynamic portion 162 of the flexible member 158 is resiliently flexible in an axial direction, and the slide surface 156 comprises at least a portion of the dynamic portion 162 of the flexible member 158.

Figure 3A:
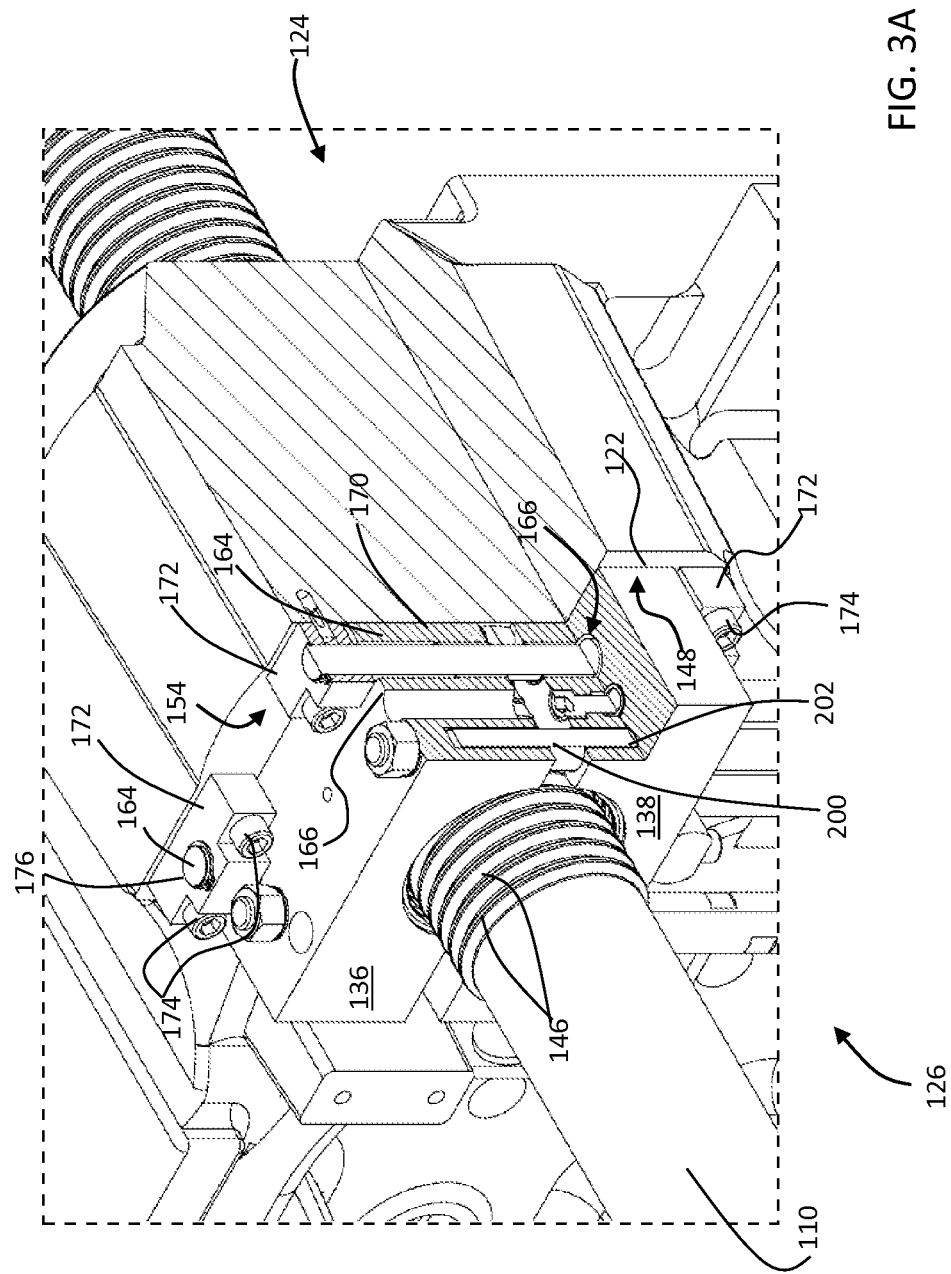
FIG. 3A is an enlarged view of a portion of the structure of FIG. 3.

With reference to FIGS. 3A and 4B, in the example illustrated, the flexible member 158 comprises a pair of guide rods 164. Each guide rod 164 is oriented parallel to the transverse direction, i.e. generally vertically in the example illustrated. The guide rods 164 are disposed in horizontally spaced-apart relation (perpendicular to the axial direction), on either side of the tie bar bore 128 (and tie bar 110 passing through the tie bar bore 128—see also FIG. 5).

Referring also to FIG. 4D, each guide rod 164 has opposed rod end portions 168 and an intermediate portion 170 extending between the rod end portions 168. The carrier assembly 154 comprises rod mounts (in the form of blocks 172 in the example illustrated) secured to the rod ends 168 of the guide rods 164 and fixed to the platen 106. Each lock nut segment 136 and 138 has a pair of boreholes 166 through which the guide rods 164 pass and the lock nut segments 136 and 138 are vertically slidable along the guide rods 164, and in particular, along the intermediate portion 170 of the guide rods.

The rod end portions 168 are fixed relative to the platen 106, and the static portion of the carrier assembly 154 comprises the rod end portions 168. In the example illustrated, the rod mounts comprise blocks 172 secured to the back side of the first platen 106, for example, by bolts 174. The rod ends 168 are fixed within vertical apertures 176 provide in the blocks 172.

The intermediate portion 170 of each guide rod 164 is joined to the rod ends 168, but is not directly fastened to the platen 106 and can deflect in the axial direction when subjected to a load in the axial direction. In the illustrated example, the dynamic portion 162 of the carrier assembly 154 includes the intermediate portion 170 of the guide rods 164.

Referring to FIG. 4D, when the slide surface is in the unloaded position, a static axis 178 of the static portion 160 of the carrier assembly (i.e. rod ends 168 in the example illustrated) is collinear with a dynamic axis 180 of the dynamic portion 162 of the carrier assembly, e.g. the intermediate portion 170. That is, the rod ends 168 and intermediate portion 170 of the guide rods 164 are straight and in axial alignment when the slide surface 156 is in the unloaded position.

To facilitate axial movement of the lock nut segments 136 and 138 toward the platen 106, the intermediate portion 170 of the guide rods 164 is moveable in the axial direction towards the platen 106 when the lock nut segments 136 and 138 transfer an axial load (e.g. from the tie bars 110 to the platen 106)—see FIG. 4C. In the loaded position, shown in FIG. 4C, the dynamic axis 180 of the dynamic portion of the carrier assembly (i.e. the intermediate portion 170 of each guide rod 164) is moved towards the platen 106 relative to the static axis 178, moving the axes 178 and 180 out of alignment by an axial offset distance 182. In some examples, marginal adjacent portions of the rod end portions 168 and intermediate portion 170 may form at least part of the transition portion 169.

At least a portion of the rod 164 can resiliently bend or otherwise distort to facilitate movement of the intermediate portion 170 relative to the end portions 168. Each guide rod 164 may have a transition portion 169 disposed along the length of each guide rod between the intermediate portion 170 and each rod end portion 168. In the example illustrated, the transition portion 169 of the rod is generally defined by the portion of the rod 164 extending between the block 172 and the surface of the split nut 136, 138 directed towards the block 172 when the split nut is in the locked position (FIG. 4B, 4C, 4D).

At least the transition portion 169, the guide rod 164 can resiliently bend when the intermediate portion 170 of the rod 164 moves from the unloaded to the loaded position. The bending of the guide rods 164 is, in the illustrated example, within the elastic deformation limit of the guide rods 164. In this configuration, the guide rods 164 can store potential energy when bent (e.g. under a clamp force exerted by the tie bars 110) and, after release of the clamp force on the tie bar 110, the rods 164 can release this stored potential energy when straightening, moving the slide surface (intermediate portion 170, in the example illustrated) back to the unloaded position, and restoring the clearance gap 152 between the abutment surfaces 148 and bearing surfaces 122 of the lock nut segments and platen. In this way, the guide rods 164 can resiliently return to their straight position automatically when the axial force on the tie bar is released, without the need for a separate, external actuator or biasing member.

Limiting the deflection of the guide rods 164 to within their elastic deformation range may facilitate cyclic loading and unloading over many, many machine cycles without permanently deforming or otherwise wearing out the rods 164. The guide rods 164 may be of unitary, integral construction along their length and can be made from a suitable material, such as for example, a steel alloy that may be annealed and/or tempered. Optionally, the rods 164 may have varying material properties along the length of the rod, for example, to provide particularly resilient flexibility in the transition region of each rod relative to other portions of the rod.

Alternatively, instead of relying solely on the resilient nature of the guide rod material, one or more actuators and/or biasing members may be used to help urge the lock nut segments 136 and 138 back to the unloaded position (i.e. spaced apart from the platen 106) when the clamp force on the tie bar 110 is removed.

Each lock assembly 116 further has a lock nut actuator mechanism 184 coupled to the lock nut segments 136, 138 for moving the segments between the locked and unlocked positions. In the example illustrated, one lock nut actuator mechanism 184 is coupled to a pair of lock assemblies.

Referring to FIG. 6, an example of a lock nut actuator mechanism 184 includes a rotary drive 186, and the camshaft 188 is urged to rotate by the rotary drive 186. In the illustrated example, the rotary drive 186 is a motor, and can be, for example, an electric motor.

Referring to FIG. 5, in the illustrated example, the actuator mechanism 186 is configured to actuate two sets of split nut segments spaced transversely apart with the actuator mechanism 186 disposed generally intermediate the two sets. In the example illustrated, one set of nut segments 136, 138 is positioned generally above the actuator mechanism 186 and one positioned generally below the actuator mechanism 186 along the non-operator side of the platen 106. Referring to FIG. 3, a second actuator mechanism 186 is provided on the other side of the platen 106 (the operator side of the platen, on the right side in FIG. 3) to drive the lock nut segments provided at the upper right and lower right corners of the platen 106. Alternatively, a separate actuator may be provided for each set of lock nut segments, or a single actuator may be used to drive all four sets of lock nut segments.

In the illustrated example, an upper drive rod 190 extends between the lock nut segment 138 toward the upper left corner of the platen 106 and the camshaft 188. The upper drive rod 190 is eccentrically mounted on the camshaft 188, so that rotation of the camshaft about axis 192 results in vertical translation of the upper drive rod 190, and the lock nut segment 138 coupled thereto. In this configuration, rotation of the camshaft 188 causes the lock nut segment 138 to travel between its locked and unlocked positions.

A pair of connecting rods 194 are provided to mechanically link the lock nut segment 138 provided above the actuator mechanism 186 to the lock nut segment 138 provided below the actuator mechanism 186 (toward the bottom of FIG. 5 as illustrated). The connecting rods 194 are, in the example illustrated, rigid elongate members that fix the transverse (i.e. vertical) spacing between the lock nut segment 138 below the upper tie bar and the lock nut segment 138 below the lower tie bar. The two lock nut segments 138, 138 are thereby coupled together so that they can translate in unison with each other relative to the platen 106. To facilitate translation of the lower lock nut segment 138, the connecting rods 194 pass generally freely through corresponding bores or passages provided in the lock nut segment 136 (illustrated using dashed lines 196 in FIG. 5). In use, when upper drive rod 190 is driven upwards by rotation of the cam shaft, the lock nut segment 138 below the upper tie bar is moved upwards (to the locked position) and the lock nut segment 138 below the lower tie bar is simultaneously moved upwards to the locked position via the connecting rods 194. When upper drive rod 190 moves downward both lock nut segments 138 move downwardly (to the unlocked position).

Similarly, a lower drive rod 198 is connected between the camshaft 188 and the lock nut segment 136 located beneath the camshaft 188 (as illustrated). The lower lock nut segment 136 is linked to the upper lock nut segment 136 by a pair of connecting rods 200, which pass through bores 202 in the upper, lock nut segment 138 (see also FIG. 3A). In this configuration, when lower drive rod 198 is driven upwards, both lock nut segments 136 move upwards (to the unlocked position), and when lower drive rod 198 moves downward both lock nut segments 136 move downwardly (to the locked position). Using a common actuator mechanism 186 to drive both sets of lock nut segments 136 and 138 illustrated in FIG. 5 may help synchronize the movement of the segments 136 and 138.

In use, at the beginning of a molding cycle of the machine 100, the nut segments 136 and 138 are in the unlocked position (FIG. 4A) and the moving platen 106 can rapidly advance to a meshing position (FIG. 4A) in which the mold is closed or near-closed, and the projections of the nut teeth 144 are in axial alignment with valleys 204 between adjacent ones of the tie bar teeth 146.

Once in the meshing position, the nut segments 136 and 138 are moved to the locked position (FIG. 4B). Axial clearance may exist between the facing surfaces of the tie bar teeth 146 and nut teeth 144 when in the meshing position, and in particular a tooth clearance distance 206 may be provided between the load-bearing side 208 (front side) of the tie bar teeth 146 and the load-bearing side 210 (back side) of the nut teeth 144. The tooth clearance distance 206 can facilitate interference-free movement of the nut segments 136 and 138 from the unlocked to locked position, which can help reduce wear of the tie bar engaging surface of the nut segments 136 and 138 (particularly the nut teeth 144) and of the tie bar teeth 146.

The nut segments 136 and 138 are also axially spaced away from the platen 106 during movement of the nut segments 136 and 138 from the unlocked to locked positions. This can help reduce the need for lubrication between the abutment surface 148 of the nut segments 136 and 138 and bearing surface 122 of the platen, and can help to reduce wear that may otherwise occur to these surfaces.

Once the nut segments 136 and 138 are in the locked position (FIG. 4B), the clamp chamber in the clamp actuator can be energized to draw the tie bar 110 in a direction towards the second platen 108. When fully clamped, the tie bar 110 is stretched to securely clamp together the mold halves carried by the platens 106 and 108. Prior to stretching, the tie bar 110 translates a first amount (relative to both the nut segments 136 and 138 and the first platen 106) to close the tooth clearance 206 and bring the front side 208 of the tie bar teeth 146 into contact with the back side 210 of the nut teeth 144. Then the tie bar 110 translates a second amount (relative to the first platen 106 but together with the locked nut segments 136 and 138) to close the nut/platen clearance gap 152 and bring the abutment surface 148 of the nut segments 136 and 138 into contact with the bearing surfaces 122 of the first platen 106. The second amount of tie bar 110 translation may be generally equal to the axial distance 150 between the abutment surface 148 and the bearing surface 122. At this point the nut segments 136 and 138 are in the loaded position (FIG. 4C), and further translation (in the clamping direction) of the portion of the tie bar 110 engaged by the nut segments 136 and 138 is generally inhibited. Rather, the tie bar 110 stretches along its length in response to further energization of the clamp actuator. In addition, there may be a small amount of translation of the tie bar as a result of bending or deflection of the platen corners as the full clamp tonnage is applied via the tie bars.

When a desired clamp force has been achieved, resin can be injected into the mold to form molded articles. After the molded articles formed in the mold have hardened sufficiently, the force exerted by the clamp actuator can be relieved. The tie bar 110 can relax (unstretch), and the lock nut segments 136, 138 can be urged apart from the platen bearing surfaces by, for example, the potential energy stored in the flexible member, to restore the nut/platen clearance 152. In some examples, another actuator can facilitate moving the tie bar back to the meshing position which can assist in restoring the nut/platen clearance 152 and the tooth clearance distance 206.

When in the meshing position, the lock nut segments 136 and 138 can be moved to the unlocked position (FIG. 4D), thereby disengaging the platen 106 from the tie bar 110. The traverse actuator 112 can then be energized to move the first platen 106 back to the mold-open position.

Referring now to FIG. 7, structure of another example of an injection molding machine 1100 is illustrated. The machine 1100 has similar features as the machine 100, with like features are identified by like reference numerals, incremented by one thousand.

In this example, a carrier assembly 1154 includes a flexible member 1158 that has a static portion 1160 coupled to the platen 1106 and a dynamic portion 1162 joined to the static portion. In the illustrated example, the flexible member 1158 is provided in the form of a flexible strip 1208 which includes the static portion 1160, in the form of a first edge 1210 that is bolted to the platen 1106, and the dynamic portion 1162 in the form of a second edge 1212 spaced away from platen. The second edge 1212 is offset from the platen 1106 by a distance 1214 to allow the second edge 1212 to deflect toward the platen 1106. In the illustrated example, the first edge 1210 of the strip 1208 is provided laterally outboard of the lock nut segments 1136 and 1138 and the second edge 1212 is provided within an axial recess 1216 provided between platen 1106 and the lock nut segment 1136, 1138.

In the example illustrated, the slide surface 1156 includes a linear rail 1218 mounted to dynamic portion (i.e. the second edge 1212) of the flexible strip 1208. The linear rail 1218 enables translation in the transverse direction (vertically in the embodiment as illustrated). The lock nut segments 1136 and 1138 are provided with bearing blocks 1220 mounted to inner side of the nut segments 1136 and 1138. The bearing blocks 1220 are slidable along the linear rail 1218 to facilitate translation of the lock nut segments 1136 and 1138 between the locked and unlocked positions.

When the machine 1100 is in use, the lock nut segments 1136 and 1138 can be moved, via actuator 1184, to a locked position in which they engage the tie bar 1110. When the tie bar 1110 is subjected to a clamp force, the nut segments 1136 and 1138 are moved with the tie bar 1110 toward the platen 1106, until the abutment surfaces 1148 engage the respective bearing surfaces 1122 on the platen 1106. The actuator mechanism 1184 is similar to mechanism 184, and is configured to drive two sets of lock nut segments 1136 and 1138 simultaneously.

In the example illustrated, the carrier assembly 1154 is configured so that when the flexible strip 1208 deflects toward the platen 1106 a slight axial gap remains between the second edge 1212 of the strip 1208 and the platen 1106 (i.e. the distance 1214 is not reduced to zero). In this configuration, when the nut segments are in the loaded position the force from the tie bar 1110 is transferred to the platen 1106 via the abutment surfaces 1148 and bearing surfaces 1122, and no axial load (or at least not the axial clamp load) is carried by the linear rail 1218 or bearing block 1220. This may help prevent wear and/or damage to the linear rail 1218 and bearing block 1220. Alternatively, the second edge 1212 may contact the platen 1106 when the nut segments 1136 and 1138 are in the loaded position.

Figures 9, 10:
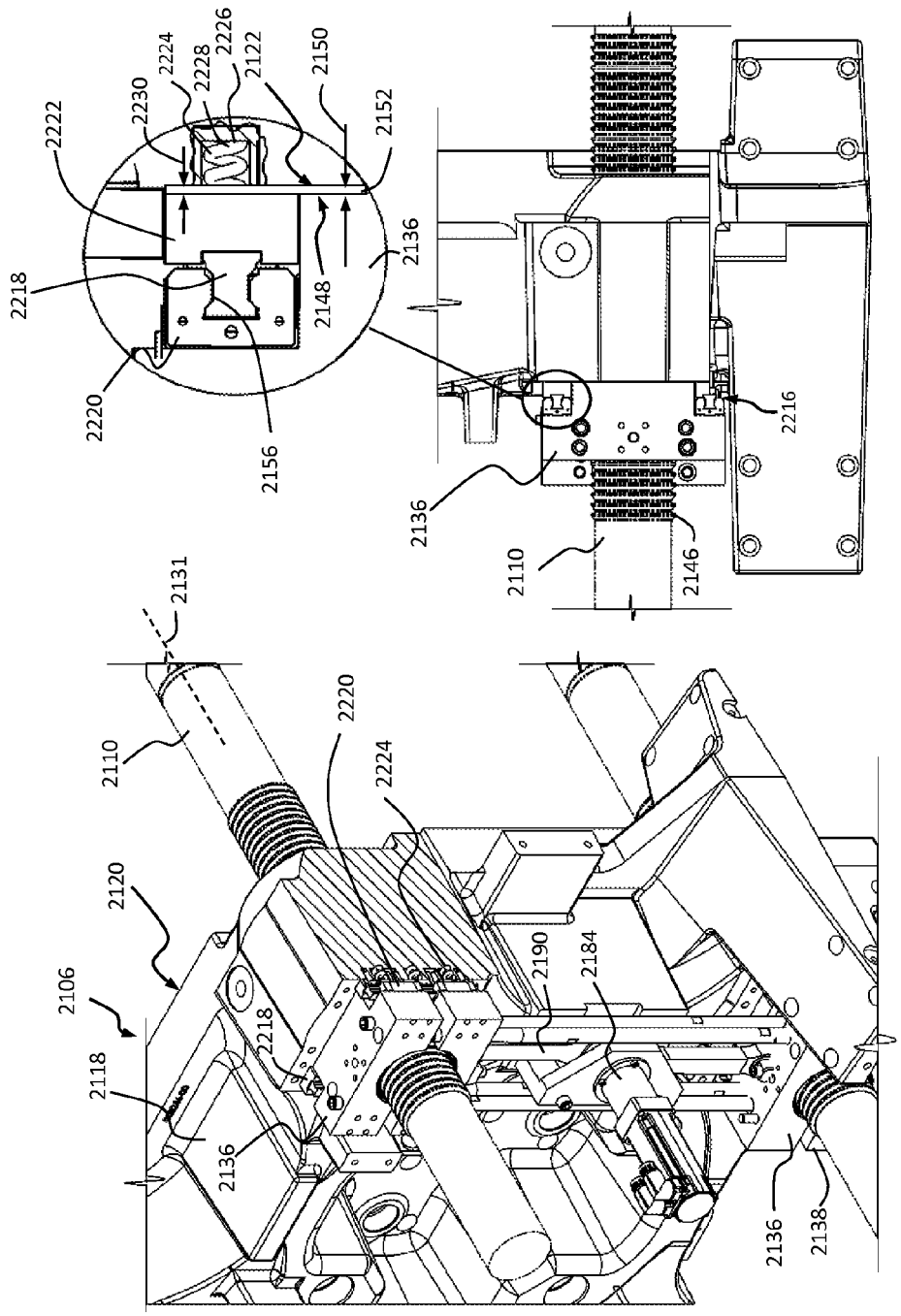
FIG. 9 is a partially cut-away perspective view of a portion of another alternate platen structure.
FIG. 10 is a top view of the structure of FIG. 9.

Referring to FIG. 9, the structure of another example of an injection molding machine 2100 is illustrated. The machine 2100 has similar features as the machine 100, with like features are identified by like reference numerals, incremented by two thousand.

In this example, the carriage assembly 2154 includes base member 2222 supporting the linear rail 2218, which comprises the slide surface 2156. The base member 2222 is axially moveable relative to the platen 2106, and is biased away from the platen 2106 using a biasing member. Any suitable biasing member may be used, and in the illustrated example the biasing member includes a plurality of compression springs 2224. Each compression spring 2224 is partially nested within a corresponding seat 2226 in the platen 2106. In this configuration, the static portion 2160 of the carriage assembly 2154 can include the inner ends 2228 of the compression springs 2224, as they are fixed relative to the platen 2106, and the dynamic portion 2162 of the carriage assembly 2154 can include the outer portion of the springs 2224, the base members 2222, linear rails 2218 and bearing blocks 2220. Optionally, the axial distance 2230 between the base member 2222 and the platen 2106 may be slightly greater than the distance 2150. This may help reduce or eliminate axial forces acting on the base member 2222 and linear rails 2218 when the nut segments 2136 and 2138 are in the loaded position. Alternatively, the distance 2230 may be equal to or less than the distance 2150.

Figure 11:
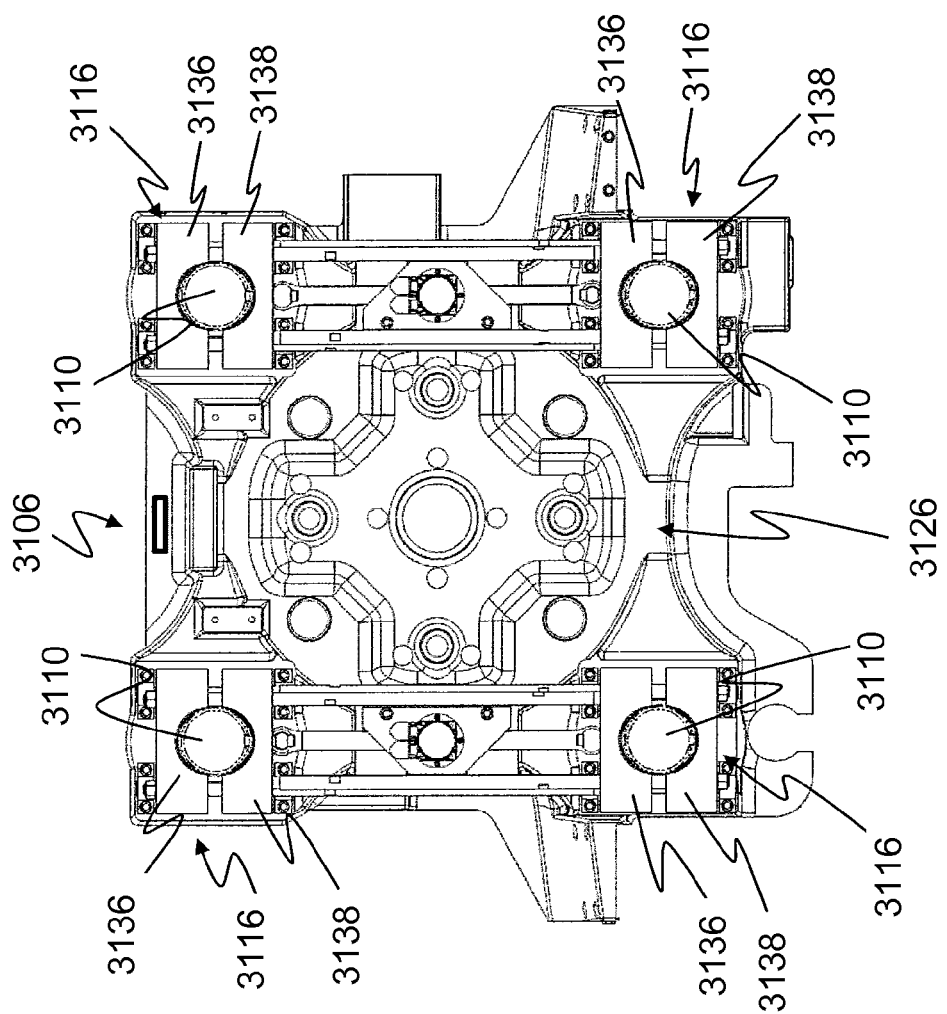
FIG. 11 is an end view of a portion of an alternate platen structure.

Referring to FIG. 11, the structure of a portion of another example of an injection molding machine 3100 is illustrated. The machine 3100 has similar features as the machine 100, with like features identified by like reference numerals, incremented by three thousand.

In the illustrated embodiment, the lock nut actuator mechanism 3184 includes a drive apparatus in the form of a motor 3186 and camshaft 3188 driven by the motor 3186.

Referring to FIG. 12, in the illustrated example, the actuator mechanism 3184 is configured to actuate two sets of split nut segments, the first set associated with a first tie bar positioned above the actuator mechanism 3184 and the second set associated with a second tie bar positioned below the actuator mechanism 3184.

Figure 15:
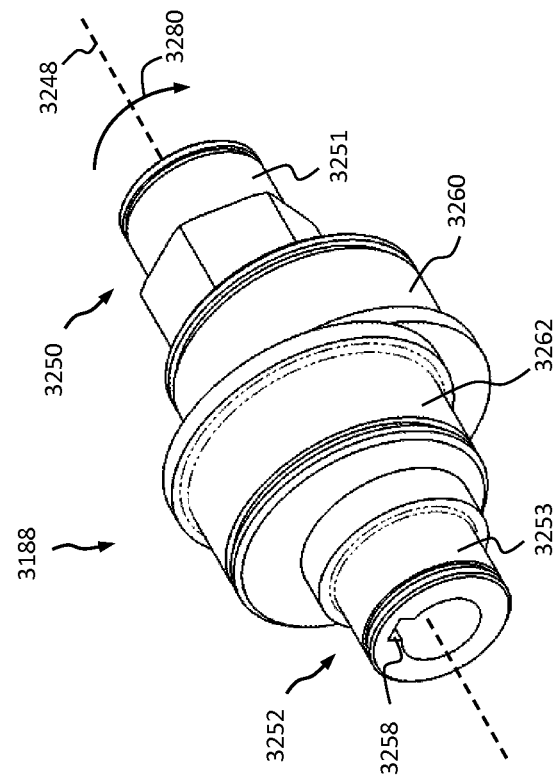
FIG. 15 is a perspective view of an example of a camshaft for use with the locking mechanism used on the platen of FIG. 11.

Referring to FIG. 15, in the illustrated example the camshaft 3188 extends along a camshaft axis 3248 and includes an inner end 3250 (i.e. the end proximate the body of the platen 3106) and an opposed outer end 3252. Referring also to FIG. 13, the inner end 3250 of the camshaft 3188 is coupled to the rear side of the platen body 3118, and the outer end 3252 is coupled to a shaft support portion 3254 of the platen 3106.

In the illustrated example, the motor 3186 is also mounted on the shaft support portion 3254 of the platen 3106. The motor 3186 has an output shaft 3187 that can be generally aligned with the camshaft 3188. In the example illustrated, the rotational axis 3189 of the output shaft 3186 is co-axial with the camshaft axis 3248 (FIG. 13). Alternatively, the motor 3186 may be mounted in a different location and need not be aligned with the camshaft 3188. Optionally, the motor 3186 may include a gear box or other suitable transmission member coupled between the motor 3186 and the camshaft 3188.

Referring again to FIG. 15, in the illustrated example, the inner end 3250 of the camshaft is provided with a first concentric support journal 3251 having a diameter 3251a. The second end 3252 of the camshaft is provided with a second concentric support journal 3253 having a diameter 3253a. In the example illustrated, the support journal diameters 3251a, 3253a are generally equal and concentric about the shaft axis 3248.

Figure 14:
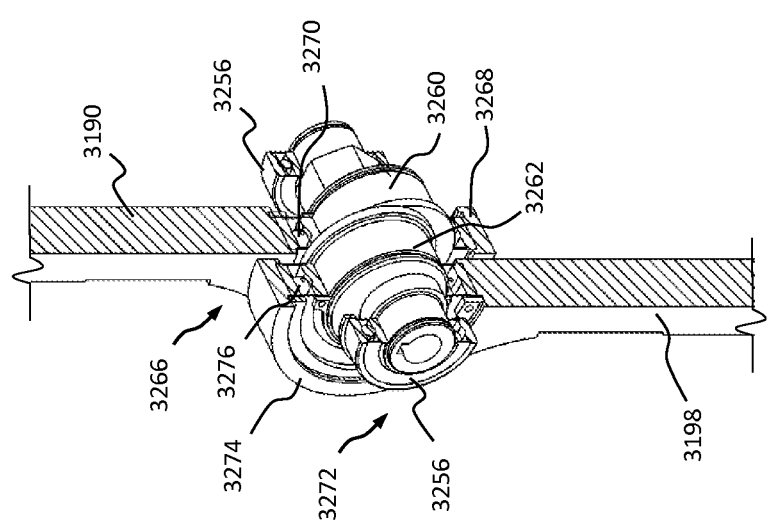
FIG. 14 is a partial cut away perspective view of a portion of the locking mechanism used on the platen of FIG. 11.

Both the inner and outer ends 3250 and 3252 may be supported by suitable support bearings 3256 (FIG. 14) to facilitate rotation of the camshaft 3188 about the camshaft axis 3248. In the example illustrated, a first support bearing 3256 has an inner surface pressed over the first concentric support journal 3251 and an outer surface pressed into a bore in the platen 106. A second support bearing 3256 has an inner surface pressed over the second concentric support journal 3253 and an outer surface pressed into a bore in the shaft support 3254. The outer end 3252 of the camshaft 3188 includes a keyway 3258 and can be keyed to the output shaft of the motor 3186.

Between the inner and outer ends 3250 and 3252, the camshaft 3188 includes a first eccentric journal 3260 and a second eccentric journal 3262. In the example illustrated, the first journal 3260 is axially spaced apart from the motor 3186, and the second journal 3262 is positioned axially intermediate the motor 3186 and the first journal 3260.

Figure 13A:
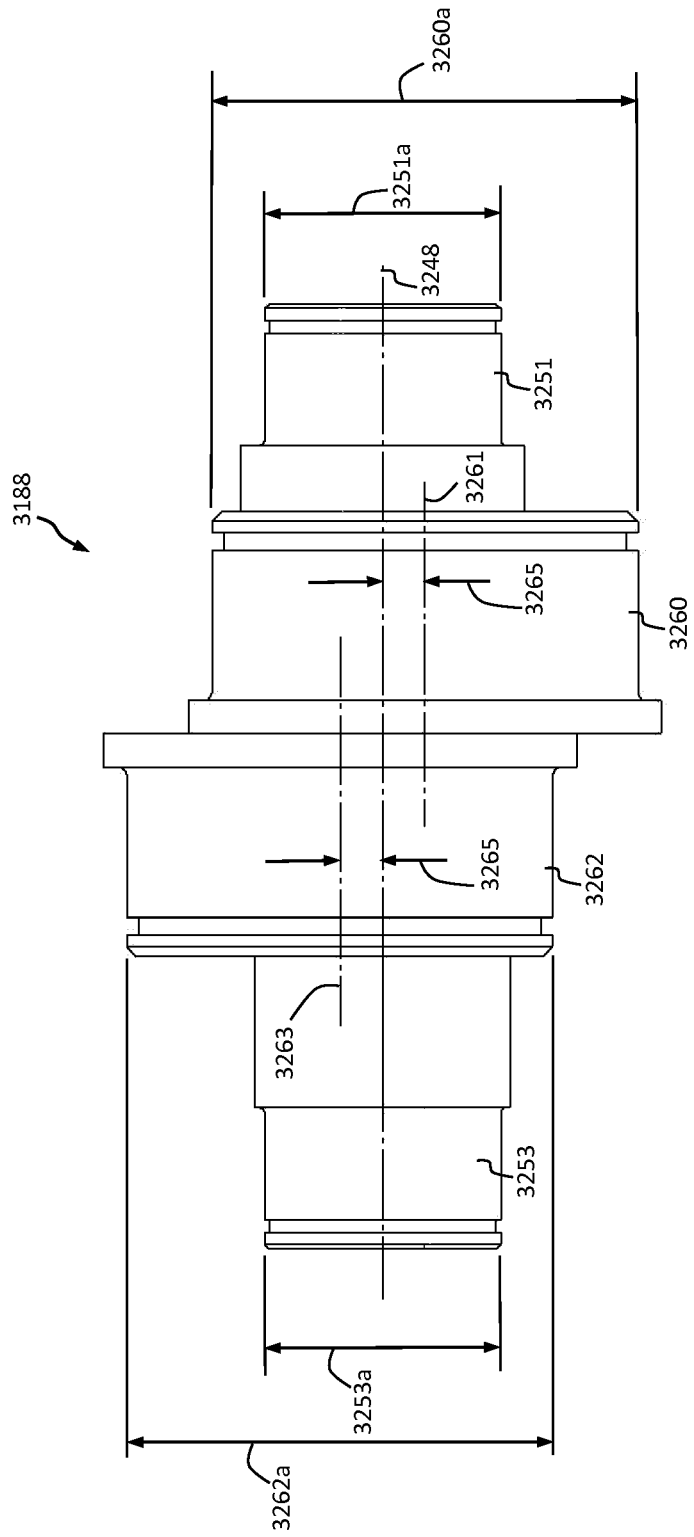
FIG. 13A is an enlarged view of a camshaft portion of the structure of FIG. 13.

With reference also to FIG. 13A, the first and second eccentric journals 3260 and 3262 are configured such that they are eccentrically positioned relative to the camshaft axis 3248. The first eccentric journal 3260 has a first eccentric journal diameter 3260a and the second eccentric journal has a second eccentric journal diameter 3262a. In the example illustrated, the first and second eccentric journal diameters 3260a, 3262a are generally equal to each other and larger than the support journal diameters 3251a, 3253a. The eccentric journal diameters may be, for example, about twice as large as the support journal diameters. The relatively large eccentric journal diameters 3260a, 3262a can help to increase the circumferential extent over which the relative rotational load between the eccentric journal and respective drive rod is distributed.

In the example illustrated, the first and second eccentric journals have respective first and second eccentric journal axes 3261, 3263 that are transversely offset from the camshaft rotation axis 3248 by an eccentric offset 3265 that is equal in magnitude, but opposite in transverse direction. The eccentric offset is, in the example illustrated, less than diameter of the eccentric journals. The camshaft rotation axis passes through the generally disc-shaped elements defining the eccentric journals. This configuration can, as compared to, for example a configuration, in which the eccentric journals are entirely laterally offset from the rotation axis of the camshaft, help to provide smoother and more energy efficient rotation of the camshaft.

An upper drive rod 3190 extends vertically upward from the camshaft 3188 toward the first (upper) tie bar. In the example illustrated, the upper drive rod 3190 has a proximal (lower) end 3266 coupled to the first journal 3260 and a distal (upper) end 3264 coupled to the lock nut segment 3138 (FIG. 12). In the illustrated example, the proximal end 3266 includes a loop portion 3268 (shown in partial cut away in FIG. 14) that encircles the first journal 3260. An optional first roller bearing 3270 may be provided between the inner surface of the loop member and the outer surface of the first journal 3260.

Similarly, a lower drive rod 3198 extends vertically downwardly from the camshaft 3188 towards the second, lower tie bar. In the example illustrated, the lower drive rod 3198 has an upper end 3272 that includes an proximal (upper) end 3272 that has a loop portion 3274 surrounding and coupled to the second journal 3262 (with an optional second roller bearing 3276), and a distal (lower) end 3278 connected to the lock nut segment 3136 (FIG. 12). The connection between the drive rods 3190 and 3198 and their respective lock nut segments 3138 and 3136 is, in the example illustrated, a pivot connection in the form of a pin joint.

In this configuration, rotation of the camshaft 3188 urges corresponding translation of the distal ends 3264, 3278 of the drive rods 3190 and 3198, and corresponding movement of the lock nut segments 3136 and 3138. In the illustrated example, the first and second journals 3260 and 3262 are configured so that when the camshaft 3188 is in a first rotational position (FIG. 13) both the drive rods 3190 and 3198 are retracted toward the camshaft 3188 and the lock nut segments 3136 and 3138 are spaced apart from the tie bars 3110. When the camshaft 3188 is rotated to a second rotational position that is 180 degrees from the first position in a direction of rotation 3280 (FIG. 15) both the drive rods 3190 and 3198 are extended away from the camshaft 3188 and the lock nut segments 3136 and 3138 will engage the tie bars 3110 to lock the platen 3106 to the tie bars 3110 as described herein.

In the illustrated example, the upper lock nut segment 3136 and the lower lock nut segment 3138 are generally identical, and the features described herein with relation to the upper lock nut segment 3136 are also present on the lower lock nut segment 3138. Alternatively, in other embodiments the lock nut segments 3136 and 3138 need not be identical.

Figure 16:
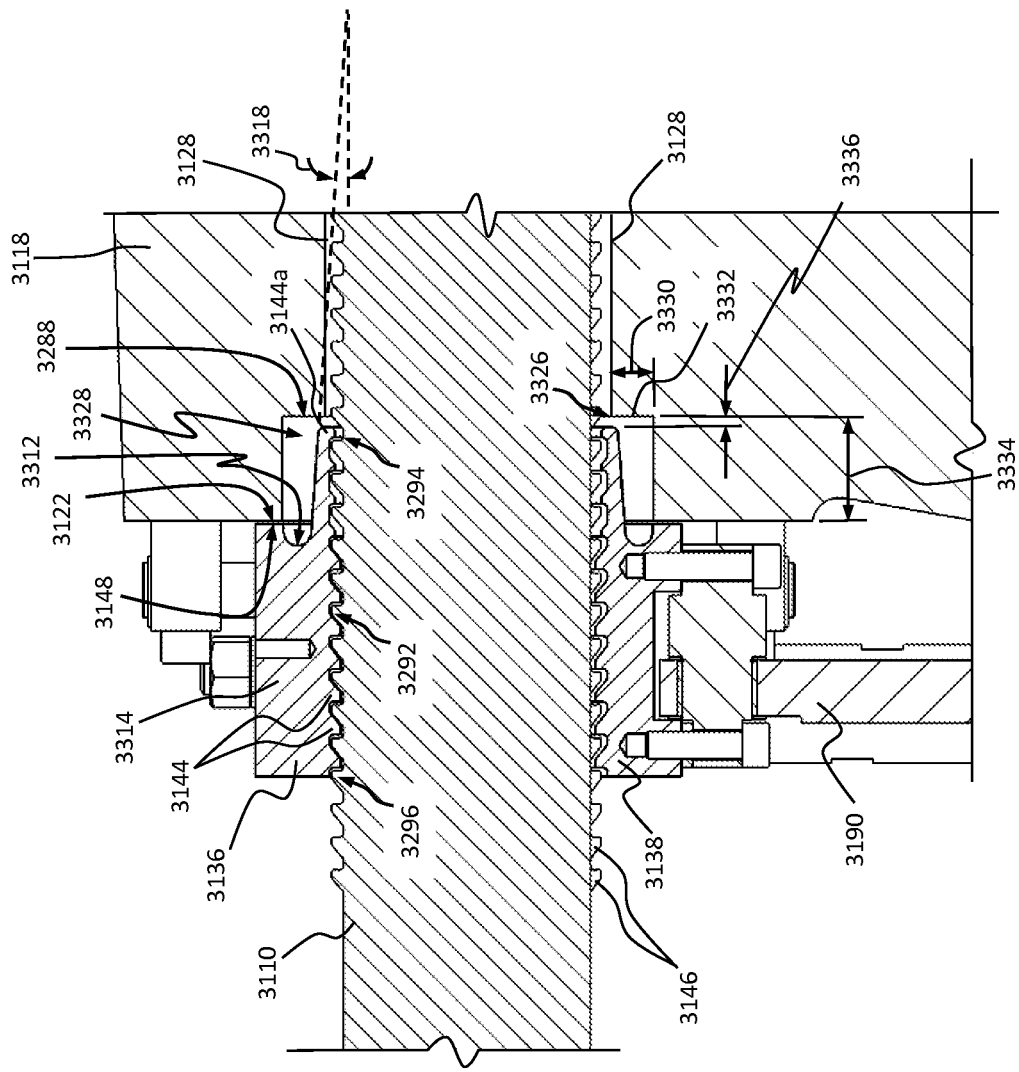
FIG. 16 is an enlarged view of a portion of the locking assembly with the lock nut segments in a meshing position.

Referring to FIG. 16, in the illustrated example the lock nut segment includes an arcuate inner surface 3289 (see also FIG. 12) having radially inwardly projecting engagement elements, in the form of teeth 3144, disposed thereon that engage the tie bar 3110 when in the locked position. The teeth 3144 are provided along a first axial extent 3290 (FIG. 17) of the lock nut segment 3136 and the toothed region defines a tie bar engagement portion 3292 extending axially between a proximal end 3294 positioned toward the platen 3106 and a distal end 3296 axially spaced apart from the proximal end 3294.

Figure 17:
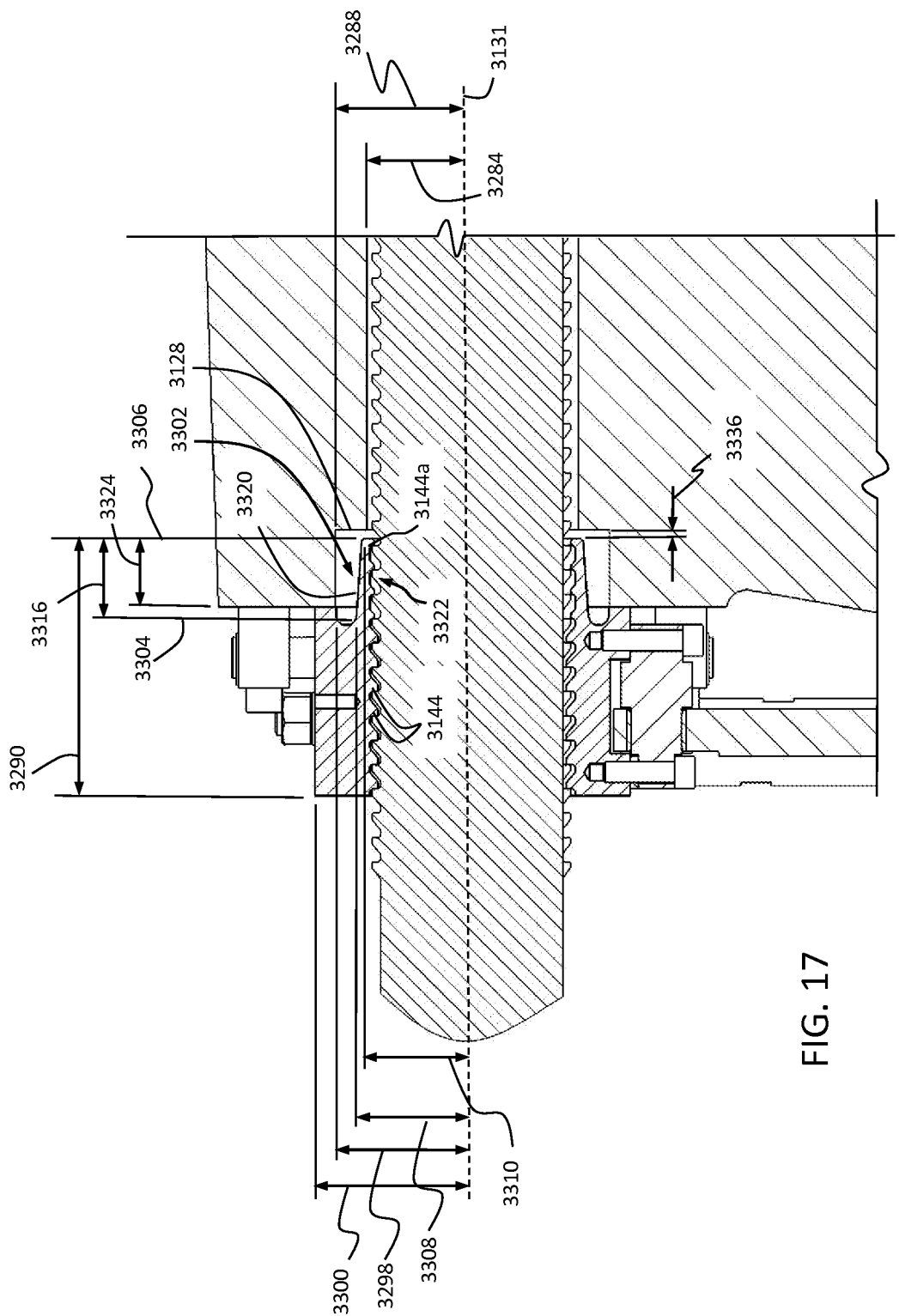
FIG. 17 is the enlarged view of FIG. 16 with the lock nut segments in a locked position.

In the illustrated example, the lock nut segment 3136 has an outer surface that includes the abutment surface 3148. Referring to FIG. 17, the abutment surface 3148 extends generally radially and has a radially inner extent 3298 and a radially outer extent 3300.

The lock nut segment 3136 also includes a narrowing section 3302 (FIG. 17). The narrowing section 3302 extends at least partially within the tie bar engagement portion 3292, and extends from a first position 3304 generally adjacent the abutment surface 3148, to a second position 3306 spaced axially apart from the abutment surface 3148 in a direction towards the proximal end 3294 of the tie bar engagement portion 3292. The narrowing section 3302 defines an axial extent 3316. Optionally, the axial extent 3316 may be selected so that it is between about 10% and about 50% or more of the axial extent 3290, or is between 25% and about 40% of the axial extent 3290. In the illustrated example, the axial extent 3316 is about 30% of the axial extent 3290.

Referring to FIG. 17, in the illustrated example, the narrowing section 3302 has a first radius 3308 at the first position 3304, and a second radius 3310 at the second position 3306 (spaced axially away from the first position 3304 towards the platen 3106), and the first radius 3308 is greater than the second radius 3310. The first diameter can be from about 5 percent to about 30 percent larger than the second diameter. In the example illustrated, the first radius 3308 is less than the radially inner extent 3298 of the abutment surface 3148.

In the example illustrated, the narrowing section 3302 comprises a taper 3320. Particularly, the outer surface of the lock nut segment 3136 between the first 3304 and second 3306 positions comprises a taper 3320. The taper 3320 can help to allow the lock nut segment 3136 to stretch axially with the tie bar 3110, which can result in an enhanced stress distribution of the clamp force among the teeth 3144. In the example illustrated, the taper 3320 extends generally linearly (at a constant slope) from the first position 3304 to the second position 3306. The included angle between the taper (outer tapered surface) 3316 and the axis 3132 defines a lock nut taper angle 3318 (FIG. 16) that is generally constant over the axial extent 3316 of the narrowing section 3302. The lock nut taper angle 3318 can at least about 2 degrees and may be at least about 5 degrees, and for example may be between about 5 and 35 degrees.

In the illustrated example, the first position 3304 is disposed axially between the abutment surface 3148 and the distal end 3296 of the tie bar engagement portion 3292. A recess 3312 is formed in the lock nut segment 3136 in a region that is radially between the abutment surface 3148 and the narrowing section 3302. Providing the recess 3312 facilitates the illustrated configuration, in which the first position 3304 (one end of the narrowing section 3302) is nested within the body portion 3314 of the lock nut segment 3136 and is located axially outboard of the abutment surface 3148. Partially nesting the narrowing section 3302 within the body portion 3314 of the lock nut segment 3136 may help reduce the overall axial extent of the lock nut segment 3136 while still enabling the axial extent of the narrowing section 3302 to provide at least 25% of the axial extent 3290 of the tie bar engagement portion 3302, and optionally between about 25% and about 40% of the axial extent 3290. This may help provide a desired amount of axial stretching of the lock nut segment 3136 while reducing its overall axial length.

Alternatively, the first position 3304 may lie in the same plane as the abutment surface 3148 or may be disposed axially between the abutment surface 3148 and the proximal end of the tie bar engagement portion 3292.

Referring to FIG. 17, the lock nut segment 3136 also defines a major load portion 3322 having a third axial extent 3324 bounded by the abutment surface 3148 and a first one 3144a of the plurality of teeth 3114, the first tooth 3144a being the tooth 3144 axially nearest the proximal end 3294 of the tie bar engagement portion 3292. In the illustrated example, the third axial extent 3324 is less than the second axial extent 3316, and is less than the first axial extent 3290, and the taper 3320 extends along the entirety of the third axial extent 3324. Optionally, the third axial extent 3324 can be set so that it is at equal to or less than the second axial extent 3316 and is at least about 20% of the first axial extent 3290. In the illustrated example the third axial extent 3324 is about 25% of the first axial extent 3290.

When the lock nut segment 3136 is in the locked position (FIG. 17) different regions of the tie bar engagement portion 3292 may be subjected to different loading conditions. For example, in the example illustrated, the major load portion 3322 and maybe the entirety of the narrowing section 3302 may be subjected to tensile stress, and at least a portion of the remainder of the tie bar engagement portion 3292 may be subjected to compressive stress.

Referring to FIG. 16, in the illustrated example, the platen 3106 includes a pocket portion 3328 that is, in the example illustrated, generally configured as an enlarged counter bore portion at one end 3326 of bore 3128, through which the tie bar is received. In the Example illustrated, and with reference to FIG. 17, the bore 3128 has a bore radial extent 3284, measured radially from the bore axis 3132, and the pocket portion 3282 has a pocket radial extent 3286 that is greater than the bore radial extent 3284. The pocket portion 3328 is, in the example illustrated, generally axially bounded by an end wall 3288, and has an open end axially opposite the end wall 3288 and adjacent the bearding surface 3122.

In the illustrated example, the axial extent 3334 is greater than the third axial extent 3324 and a stretch gap 3336 is provided between the proximal end 3294 of the tie bar engagement portion 3292 and the end wall 3332 of the pocket portion 3328. In the example illustrated, the axial extent 3334 is selected so that even after the narrowing section 3302 has stretched under axial loading (FIG. 17), the stretch gap 3336 remains (while having a slightly reduced axial extent). Providing a stretch gap 3336 may help facilitate stretching or elongation of the narrowing section 3302 under tensile loading while preventing contact between the proximal end 3294 of the tie bar engagement portion 3292 and the end wall 3332 of the pocket portion 3328, which may limit stretching.

In the example illustrated, at least a portion of lock nut segment 3136 can be nested within the pocket portion 3328. This may help reduce the overall size of the combination of the platen 3106 and the lock assembly 3116. More preferably, at least a portion of the narrowing section 3302 and/or the major load portion 3322 can be nested within the pocket portion 3328. In the illustrated example, when the lock nut segment 3136 is in the locked position (FIG. 17) the entirely of the major load portion 3322, and therefore a portion of the narrowing section 3302, is nested within the pocket portion 3328.

In the example illustrated, the second axial extent 3316 is at least about 90% of the third axial extent 3324, and can be about 115% of the third axial extent 3324.

In the illustrated example, the tie bar engagement portion 3292 includes 11 teeth 3144, the narrowing section 3302 includes 4 teeth and the major load portion 3322 includes 3 teeth, including the first tooth 3144a. Alternatively, the narrowing section 3302 may include at least 4 teeth, or fewer than 4 teeth, and the major load portion 3322 may include at least 3 teeth, or fewer than 3 teeth. In the example illustrated, the first tooth 3144a is smaller than some of the other teeth 3144, and the size of the teeth and gradually increase (for example over a span of 2-4 teeth or more) from the first tooth 3144a toward the distal end 3296 of the tie bar engagement portion 3292.

While the above description provides examples of one or more processes or apparatuses, it will be appreciated that other processes or apparatuses may be within the scope of the accompanying claims.

The invention claimed is:

1. A lock assembly for releasably coupling together a platen and a tie bar of an injection molding machine, the lock assembly comprising:
   a) a first lock nut segment and an opposed second lock nut segment each slidably supported adjacent a bore extending through a platen, the lock nut segments translatable in a transverse direction towards and away from each other between a locked position for engaging a tie bar passing through the bore and an unlocked position for disengaging the tie bar, wherein when in the locked position, a tensile force on the tie bar in an axial direction generally perpendicular to the transverse direction is transferable to the platen via the lock nut segments, and when in the unlocked position, axial movement of the tie bar relative to the lock nut segments is unrestricted by the lock nut segments;
   b) an actuation mechanism for moving the first and second lock nut segments between the locked and unlocked positions; and
   c) a carrier assembly coupling together the platen and the lock nut segments, the carrier assembly including a slide surface extending in the transverse direction for slidably supporting the lock nut segments during translation of the lock nut segments between the locked and unlocked positions, the slide surface resiliently moveable in the axial direction between a loaded position in which the lock nut segments bear against the platen when the tensile force is applied to the tie bar, and an unloaded position in which the lock nut segments are spaced away from the platen by a clearance gap when the tensile force on the tie bar is released;
   wherein the carrier assembly comprises a flexible member having a static portion for mounting in fixed relation to the platen and a dynamic portion joined to the static portion and resiliently flexible relative to the static portion;
   wherein the dynamic portion of the flexible member is resiliently flexible in the axial direction; and
   wherein the slide surface comprises at least a portion of the dynamic portion of the flexible member.

2. The lock assembly of claim 1, wherein the actuation mechanism comprises:
   a) a camshaft rotatable about a shaft axis between first and second rotary positions, the camshaft comprising a first eccentric journal;
   b) a rotary drive coupled to the camshaft; and
   c) a first drive rod having a first proximal end coupled to the first eccentric journal and a first distal end coupled to the first lock nut segment.

3. The lock assembly of claim 1, wherein the slide surface is axially movable together with the lock nut segments between the unloaded and loaded positions.

4. The lock assembly of claim 1, wherein the slide surface is biased to the unloaded position.

5. A lock assembly for releasably coupling together a platen and a tie bar of an injection molding machine, the lock assembly comprising:
   a) a first lock nut segment and an opposed second lock nut segment each slidably supported adjacent a bore extending through a platen, the lock nut segments translatable in a transverse direction towards and away from each other between a locked position for engaging a tie bar passing through the bore and an unlocked position for disengaging the tie bar, wherein when in the locked position, a tensile force on the tie bar in an axial direction generally perpendicular to the transverse direction is transferable to the platen via the lock nut segments, and when in the unlocked position, axial movement of the tie bar relative to the lock nut segments is unrestricted by the lock nut segments;

b) an actuation mechanism for moving the first and second lock nut segments between the locked and unlocked positions; and c) a carrier assembly coupling together the platen and the lock nut segments, the carrier assembly including a slide surface extending in the transverse direction for slidably supporting the lock nut segments during translation of the lock nut segments between the locked and unlocked positions, the slide surface resiliently moveable in the axial direction between a loaded position in which the lock nut segments bear against the platen when the tensile force is applied to the tie bar, and an unloaded position in which the lock nut segments are spaced away from the platen by a clearance gap when the tensile force on the tie bar is released;

wherein the carrier assembly comprises a flexible member having a static portion for mounting in fixed relation to the platen and a dynamic portion joined to the static portion and resiliently flexible relative to the static portion; and wherein the flexible member comprises at least one guide rod disposed adjacent the tie bar and oriented parallel to the transverse direction, the rod having transversely opposed rod ends mounted in fixed relation to the platen, and the rod having an intermediate portion disposed between the two rod ends, the intermediate portion resiliently flexible in the axial direction relative to the rod ends.

6. The lock assembly of claim 5, wherein the first and second lock nut segments have aligned boreholes therethrough, the guide rod passing through the boreholes in sliding fit, the first and second lock nut segments slidable along at least the intermediate portion of the guide rod.

7. The lock assembly of claim 5, wherein the platen has load bearing surfaces directed towards the lock nut segments, and the lock nut segments have abutment surfaces directed towards the platen, the bearing surfaces and abutment surfaces spaced axially apart by the clearance gap when the nut segments are in the unloaded position, and the abutment surfaces pressing against the bearing surfaces when the nut segments are in the loaded position.

8. The lock assembly of claim 5, wherein the rod ends and intermediate portion of the guide rod are straight and in axial alignment when the lock nut segments are in the unloaded position, and wherein the intermediate portion of the guide rod is bendable towards the platen when the lock nut segments are in the loaded position.

9. The lock assembly of claim 8, wherein the bending of the guide rod is within the elastic deformation limit of the guide rod, the guide rod storing potential energy when bent for urging the guide rod back to the straight condition and the slide surface to the unloaded position when the tensile force on the tie bar is released.

10. The lock assembly of claim 5, wherein the slide surface is axially movable together with the lock nut segments between the unloaded and loaded positions.

11. The lock assembly of claim 5, wherein the slide surface is biased to the unloaded position.

12. An infection molding machine, comprising:

a) a base;

b) a first platen and a second platen each supported by the base, at least one of the platens moveable towards and away from the other for opening and closing a mold comprising mold halves mounted to the platens;

c) at least one tie bar extending in an axial direction between the platens for transmitting a clamping force across the mold when closed;

d) a first lock nut segment and an opposed second lock nut segment each slidably supported by a carrier assembly coupled to the first platen, the lock nut segments translatable in a transverse direction generally perpendicular to the axial direction towards and away from each other between a locked position for engaging the tie bar and an unlocked position for disengaging the tie bar;

e) an actuation mechanism for moving the first and second lock nut segments between the locked and unlocked positions;

wherein when in the locked position, the clamping force is transferred to the first platen via the lock nut segments, and when in the unlocked position, axial movement of the tie bar relative to the lock nut segments is unrestricted by the lock nut segments;

wherein the carrier assembly includes a slide surface extending in the transverse direction for slidably supporting the lock nut segments during translation of the lock nut segments between the locked and unlocked positions, the slide surface resiliently moveable in the axial direction between a loaded position in which the lock nut segments bear against the first platen when the clamping force is applied to the mold and an unloaded position in which the nut segments are spaced away from the first platen by a clearance gap when the clamping force is released;

wherein the carrier assembly comprises a flexible member having a static portion for mounting in fixed relation to the first platen and a dynamic portion joined to the static portion and resiliently flexible relative to the static portion;

wherein the dynamic portion of the flexible member is resiliently flexible in the axial direction; and wherein the slide surface comprises at least a portion of the dynamic portion of the flexible member.

13. The machine of claim 12, wherein the flexible member comprises a pair of guide rods, the guide rods oriented parallel to the transverse direction and spaced apart from each other on either side of the tie bar, the lock nut segments having bores through which the guide rods pass, the lock nut segments slidable along the guide rods.

14. The machine of claim 13, wherein each guide rod has opposed rod end portions and an intermediate portion extending between the rod end portions, the static portion of the carrier assembly comprising the rod end portions, and the dynamic portion of the carrier assembly comprising the intermediate portion of the guide rods.

* * * * *